US011769108B2

(12) United States Patent
Sager et al.

(10) Patent No.: US 11,769,108 B2
(45) Date of Patent: Sep. 26, 2023

(54) DETERMINING ALTERNATIVE DELIVERY DESTINATIONS

(71) Applicant: United Parcel Service of America, Inc., Atlanta, GA (US)

(72) Inventors: Jeffrey Carl Sager, Dallastown, PA (US); William Gensburg, Larchmont, NY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 276 days.

(21) Appl. No.: 16/938,186

(22) Filed: Jul. 24, 2020

(65) Prior Publication Data

US 2020/0356950 A1 Nov. 12, 2020

Related U.S. Application Data

(63) Continuation of application No. 14/640,753, filed on Mar. 6, 2015, now Pat. No. 10,733,563.

(Continued)

(51) Int. Cl.
*G06Q 10/0835* (2023.01)
*B07C 3/00* (2006.01)

(52) U.S. Cl.
CPC ......... *G06Q 10/08355* (2013.01); *B07C 3/00* (2013.01); *B07C 2301/005* (2013.01)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 3,721,096 A 3/1973 Deckert et al.
3,876,059 A 4/1975 Durst
(Continued)

FOREIGN PATENT DOCUMENTS

CN 1643534 A 7/2005
CN 101203873 A 6/2008
(Continued)

OTHER PUBLICATIONS

Fedex.com, "Package Recipients Can Now Customize Deliveries to their Home with FedEX Delivery Manager", accessed Apr. 28, 2023, Apr. 23, 2013 (Year: 2013).*

(Continued)

*Primary Examiner* — Emmett K. Walsh
(74) *Attorney, Agent, or Firm* — Shook, Hardy & Bacon L.L.P.

(57) ABSTRACT

Systems, methods, apparatus, and computer program products are provided for determining alternative delivery destinations. For example, in various embodiments, a method may be provided comprising receiving shipping information/data for an item indicating the item to be delivered to an original consignee by a carrier and comprising at least a default delivery location, determining whether the original consignee has indicated a first priority alternative consignee among one or more alternative consignees, and in an instance in which a determination is made that the original consignee has indicated the first priority alternative consignee among the one or more alternative consignees, delivering the item to the first priority alternative consignee.

20 Claims, 11 Drawing Sheets

Related U.S. Application Data

(60) Provisional application No. 61/952,163, filed on Mar. 13, 2014.

(56) References Cited

U.S. PATENT DOCUMENTS

| | | | |
|---|---|---|---|
| 3,933,031 | A | 1/1976 | Uhlarik |
| 4,111,601 | A | 9/1978 | Richard |
| 4,832,204 | A | 5/1989 | Handy et al. |
| 5,153,842 | A | 10/1992 | Dlugos et al. |
| 5,168,444 | A | 12/1992 | Cukor et al. |
| 5,375,240 | A | 12/1994 | Grundy |
| 5,400,020 | A | 3/1995 | Jones et al. |
| 5,444,444 | A | 8/1995 | Ross et al. |
| 5,460,110 | A | 10/1995 | Eronen et al. |
| 5,623,260 | A | 4/1997 | Jones |
| 5,648,770 | A | 7/1997 | Ross |
| 5,656,799 | A | 8/1997 | Ramsden et al. |
| 5,657,010 | A | 8/1997 | Jones |
| 5,659,731 | A | 8/1997 | Gustafson |
| 5,668,543 | A | 9/1997 | Jones |
| 5,711,670 | A | 1/1998 | Barr |
| 5,786,748 | A | 7/1998 | Nikolic et al. |
| 5,831,860 | A | 11/1998 | Foladare et al. |
| 5,835,377 | A | 11/1998 | Bush |
| 5,884,272 | A | 3/1999 | Walker et al. |
| 5,971,587 | A | 10/1999 | Kato et al. |
| 6,029,140 | A | 2/2000 | Martin et al. |
| 6,047,264 | A | 4/2000 | Fisher et al. |
| 6,085,170 | A | 7/2000 | Tsukuda |
| 6,208,980 | B1 | 3/2001 | Kara |
| 6,211,781 | B1 | 4/2001 | Mcdonald |
| 6,220,509 | B1 | 4/2001 | Byford |
| 6,236,972 | B1 | 5/2001 | Shkedy |
| 6,278,936 | B1 | 8/2001 | Jones |
| 6,285,916 | B1 | 9/2001 | Kadaba et al. |
| 6,289,323 | B1 | 9/2001 | Gordon et al. |
| 6,292,709 | B1 | 9/2001 | Uhl et al. |
| 6,304,856 | B1 | 10/2001 | Soga et al. |
| 6,313,760 | B1 | 11/2001 | Jones |
| 6,317,060 | B1 | 11/2001 | Jones |
| 6,323,254 | B1 | 11/2001 | Weikard et al. |
| 6,343,275 | B1 | 1/2002 | Wong |
| 6,344,796 | B1 | 2/2002 | Ogilvie et al. |
| 6,356,196 | B1 | 3/2002 | Wong et al. |
| 6,363,323 | B1 | 3/2002 | Jones |
| 6,411,891 | B1 | 6/2002 | Jones |
| 6,422,506 | B1 | 7/2002 | Colby |
| 6,442,589 | B1 | 8/2002 | Takahashi et al. |
| 6,463,354 | B1 | 10/2002 | Pintsov |
| 6,463,420 | B1 | 10/2002 | Guidice et al. |
| 6,486,801 | B1 | 11/2002 | Jones |
| 6,492,912 | B1 | 12/2002 | Jones |
| 6,510,383 | B1 | 1/2003 | Jones |
| 6,536,659 | B1 | 3/2003 | Hauser et al. |
| 6,539,360 | B1 | 3/2003 | Kadaba |
| 6,606,604 | B1 | 8/2003 | Dutta |
| 6,618,668 | B1 | 9/2003 | Laird et al. |
| 6,634,551 | B2 | 10/2003 | Barta et al. |
| 6,683,542 | B1 | 1/2004 | Jones |
| 6,700,507 | B2 | 3/2004 | Jones |
| 6,701,299 | B2 | 3/2004 | Kraisser et al. |
| 6,714,859 | B2 | 3/2004 | Jones |
| 6,741,927 | B2 | 5/2004 | Jones |
| 6,748,318 | B1 | 6/2004 | Jones |
| 6,748,320 | B2 | 6/2004 | Jones |
| 6,763,299 | B2 | 7/2004 | Jones |
| 6,763,300 | B2 | 7/2004 | Jones |
| 6,765,487 | B1 | 7/2004 | Holmes et al. |
| 6,772,130 | B1 | 8/2004 | Karbowski et al. |
| 6,804,606 | B2 | 10/2004 | Jones |
| 6,845,448 | B1 | 1/2005 | Chaganti et al. |
| 6,859,722 | B2 | 2/2005 | Jones |
| 6,862,612 | B1 | 3/2005 | Horn et al. |
| 6,902,109 | B2 | 6/2005 | Barta et al. |
| 6,904,359 | B2 | 6/2005 | Jones |
| 6,931,314 | B2 | 8/2005 | Holland et al. |
| 6,952,645 | B1 | 10/2005 | Jones |
| 6,975,998 | B1 | 12/2005 | Jones |
| 6,976,090 | B2 | 12/2005 | Ben-shaul et al. |
| 6,976,900 | B2 | 12/2005 | Bolz |
| 6,978,929 | B2 | 12/2005 | Buie et al. |
| 6,985,871 | B2 | 1/2006 | Simon et al. |
| 6,994,253 | B2 | 2/2006 | Miller et al. |
| 7,028,895 | B2 | 4/2006 | Ashaari |
| 7,030,781 | B2 | 4/2006 | Jones |
| 7,031,959 | B2 | 4/2006 | Garner et al. |
| 7,039,813 | B2 | 5/2006 | Algazi et al. |
| 7,130,803 | B1 | 10/2006 | Couch et al. |
| 7,152,375 | B1 | 12/2006 | Mastro et al. |
| 7,158,948 | B1 | 1/2007 | Rodriguez et al. |
| 7,177,825 | B1 | 2/2007 | Borders et al. |
| 7,212,829 | B1 | 5/2007 | Lau et al. |
| 7,212,984 | B2 | 5/2007 | Wolfe et al. |
| 7,222,081 | B1 | 5/2007 | Sone |
| 7,225,983 | B2 | 6/2007 | Park et al. |
| 7,233,907 | B2 | 6/2007 | Young |
| 7,248,160 | B2 | 7/2007 | Mangan et al. |
| 7,249,044 | B2 | 7/2007 | Kumar et al. |
| 7,249,087 | B2 | 7/2007 | Sharp et al. |
| 7,257,552 | B1 | 8/2007 | Franco |
| 7,305,404 | B2 | 12/2007 | Owens et al. |
| 7,312,702 | B1 | 12/2007 | Willms et al. |
| 7,331,248 | B2 | 2/2008 | Maresca et al. |
| 7,363,126 | B1 | 4/2008 | Zhong et al. |
| 7,376,598 | B2 | 5/2008 | Estes et al. |
| 7,385,499 | B2 | 6/2008 | Horton et al. |
| 7,422,149 | B2 | 9/2008 | Aptekar |
| 7,479,899 | B2 | 1/2009 | Horstemeyer |
| 7,501,946 | B2 | 3/2009 | Lanigan et al. |
| 7,511,617 | B2 | 3/2009 | Burman et al. |
| 7,528,722 | B2 | 5/2009 | Nelson |
| 7,531,163 | B2 | 5/2009 | Samadpour |
| 7,542,972 | B2 | 6/2009 | Owens et al. |
| 7,574,366 | B2 | 8/2009 | Burman et al. |
| 7,580,845 | B2 | 8/2009 | Burman et al. |
| 7,624,024 | B2 | 11/2009 | Levis et al. |
| 7,647,231 | B2 | 1/2010 | Kuebert et al. |
| 7,657,466 | B2 | 2/2010 | Klingenberg et al. |
| 7,693,723 | B2 | 4/2010 | Wade |
| 7,711,654 | B2 | 5/2010 | Schmidtberg et al. |
| 7,712,670 | B2 | 5/2010 | Sauerwein et al. |
| 7,742,928 | B2 | 6/2010 | Reynolds et al. |
| 7,752,134 | B2 | 7/2010 | Spear |
| 7,765,131 | B2 | 7/2010 | Klingenberg et al. |
| 7,769,778 | B2 | 8/2010 | Snapp et al. |
| 7,831,439 | B1 | 11/2010 | Bryar et al. |
| 7,848,961 | B2 | 12/2010 | Estes et al. |
| 7,853,481 | B1 | 12/2010 | Johnson |
| 7,868,753 | B2 | 1/2011 | Jenkins et al. |
| 7,912,854 | B2 | 3/2011 | Owens et al. |
| 7,925,524 | B2 | 4/2011 | Florence |
| 7,962,422 | B1 * | 6/2011 | Melechko ............ G06Q 20/202 705/333 |
| 7,969,306 | B2 | 6/2011 | Ebert et al. |
| 7,984,289 | B2 | 7/2011 | Orbke et al. |
| 7,996,328 | B1 | 8/2011 | Lundberg et al. |
| 8,015,023 | B1 | 9/2011 | Lee et al. |
| 8,027,933 | B2 | 9/2011 | Lou et al. |
| 8,036,993 | B2 | 10/2011 | Estes |
| 8,068,930 | B2 | 11/2011 | Perez et al. |
| 8,103,521 | B2 | 1/2012 | Kuebert et al. |
| 8,103,716 | B2 | 1/2012 | Boyce et al. |
| 8,117,462 | B2 | 2/2012 | Snapp et al. |
| 8,131,652 | B2 | 3/2012 | Gullo et al. |
| 8,140,551 | B2 | 3/2012 | Garner et al. |
| 8,140,592 | B2 | 3/2012 | Scott et al. |
| 8,249,998 | B2 | 8/2012 | Reynolds et al. |
| 8,255,235 | B2 | 8/2012 | Aldstadt |
| 8,255,339 | B2 | 8/2012 | Andrew |
| 8,265,947 | B2 | 9/2012 | Kuebert et al. |
| 8,291,234 | B2 | 10/2012 | Snapp et al. |
| 8,340,978 | B2 | 12/2012 | Wade |
| 8,352,551 | B2 | 1/2013 | Campbell et al. |
| 8,356,187 | B2 | 1/2013 | Cook et al. |

(56) References Cited

U.S. PATENT DOCUMENTS

| | | |
|---|---|---|
| 8,364,953 B2 | 1/2013 | Bullard, Jr. |
| 8,380,641 B1 | 2/2013 | Bennett et al. |
| 8,386,516 B2 | 2/2013 | Owens et al. |
| 8,429,019 B1 | 4/2013 | Yeatts et al. |
| 8,463,568 B1 | 6/2013 | Wynn |
| 8,489,520 B2 | 7/2013 | Kuebert et al. |
| 8,554,694 B1 | 10/2013 | Ward et al. |
| 8,577,802 B1 | 11/2013 | Nichols et al. |
| 8,645,232 B1 | 2/2014 | Cole et al. |
| 8,731,699 B2 | 5/2014 | Nagy et al. |
| 8,736,633 B2 | 5/2014 | Gurusamy |
| 8,812,374 B1 | 8/2014 | Sriram et al. |
| 9,032,032 B2 | 5/2015 | Mills et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0032573 A1 | 3/2002 | Williams et al. |
| 2002/0032612 A1 | 3/2002 | Williams et al. |
| 2002/0032623 A1 | 3/2002 | Wheeler et al. |
| 2002/0042808 A1 | 4/2002 | Smith et al. |
| 2002/0070882 A1 | 6/2002 | Jones |
| 2002/0073039 A1 | 6/2002 | Ogg et al. |
| 2002/0082770 A1 | 6/2002 | Jones |
| 2002/0087371 A1 | 7/2002 | Abendroth |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178016 A1* | 11/2002 | McLellan ............... G07F 17/13 340/568.1 |
| 2002/0178074 A1 | 11/2002 | Bloom |
| 2003/0003936 A1 | 1/2003 | Tighe |
| 2003/0004893 A1 | 1/2003 | Blaesche |
| 2003/0032573 A1 | 2/2003 | Tanner et al. |
| 2003/0036938 A1 | 2/2003 | Dutta et al. |
| 2003/0037009 A1 | 2/2003 | Tobin et al. |
| 2003/0074411 A1 | 4/2003 | Nale |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0182017 A1 | 9/2003 | Odonohue et al. |
| 2003/0193414 A1 | 10/2003 | Jones |
| 2003/0195811 A1 | 10/2003 | Hayes et al. |
| 2003/0200168 A1 | 10/2003 | Cullen et al. |
| 2004/0030478 A1 | 2/2004 | Holland et al. |
| 2004/0073499 A1 | 4/2004 | Martin et al. |
| 2004/0088224 A1 | 5/2004 | Mukai |
| 2004/0093312 A1 | 5/2004 | Cordery et al. |
| 2004/0117326 A1 | 6/2004 | Amato |
| 2004/0117328 A1 | 6/2004 | Andrew |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0193438 A1 | 9/2004 | Stashluk et al. |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0221005 A1 | 11/2004 | Albaugh et al. |
| 2004/0227630 A1 | 11/2004 | Shannon et al. |
| 2004/0241644 A1 | 12/2004 | Samadpour |
| 2004/0243430 A1 | 12/2004 | Horstemeyer |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1* | 1/2005 | McLellan ............... G06Q 10/047 705/400 |
| 2005/0038758 A1 | 2/2005 | Hilbush et al. |
| 2005/0043845 A1 | 2/2005 | Wiechers |
| 2005/0071258 A1 | 3/2005 | Kumakawa |
| 2005/0080638 A1 | 4/2005 | Maseruka |
| 2005/0082752 A1 | 4/2005 | Acosta |
| 2005/0104716 A1 | 5/2005 | Simms et al. |
| 2005/0114221 A1 | 5/2005 | Walters et al. |
| 2005/0177387 A1 | 8/2005 | Mojsa |
| 2005/0216144 A1 | 9/2005 | Baldassa |
| 2005/0216294 A1 | 9/2005 | Labow |
| 2005/0216553 A1 | 9/2005 | Mallonee et al. |
| 2005/0251402 A1 | 11/2005 | Olsen et al. |
| 2005/0252596 A1 | 11/2005 | Olsen et al. |
| 2006/0010037 A1 | 1/2006 | Angert et al. |
| 2006/0022895 A1 | 2/2006 | Williams et al. |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0074729 A1 | 4/2006 | Capotosto et al. |
| 2006/0085273 A1 | 4/2006 | Mayer et al. |
| 2006/0097896 A1 | 5/2006 | Jones |
| 2006/0100970 A1 | 5/2006 | Morony et al. |
| 2006/0149577 A1 | 7/2006 | Stashluk et al. |
| 2006/0229895 A1 | 10/2006 | Kodger |
| 2006/0248941 A1 | 11/2006 | Maresca et al. |
| 2006/0255136 A1 | 11/2006 | Wagner et al. |
| 2006/0282277 A1 | 12/2006 | Ng |
| 2007/0000989 A1 | 1/2007 | Kadaba |
| 2007/0005452 A1 | 1/2007 | Klingenberg et al. |
| 2007/0078797 A1 | 4/2007 | Won et al. |
| 2007/0083410 A1 | 4/2007 | Hanna |
| 2007/0133876 A1 | 6/2007 | Chande et al. |
| 2007/0150533 A1 | 6/2007 | Krause et al. |
| 2007/0156415 A1 | 7/2007 | Foth et al. |
| 2007/0156439 A1 | 7/2007 | Fyda et al. |
| 2007/0192191 A1 | 8/2007 | Neal et al. |
| 2007/0200671 A1 | 8/2007 | Kelley et al. |
| 2007/0202802 A1 | 8/2007 | Kallio et al. |
| 2007/0257774 A1 | 11/2007 | Stumpert et al. |
| 2008/0004995 A1 | 1/2008 | Klingenberg et al. |
| 2008/0080700 A1 | 4/2008 | Mock et al. |
| 2008/0125959 A1 | 5/2008 | Doherty et al. |
| 2008/0133261 A1 | 6/2008 | Ray |
| 2008/0154781 A1 | 6/2008 | Kumar |
| 2008/0162241 A1 | 7/2008 | Betancourt |
| 2008/0172305 A1 | 7/2008 | Estes et al. |
| 2008/0201155 A1 | 8/2008 | Som |
| 2008/0208772 A1 | 8/2008 | Rundle |
| 2008/0210749 A1 | 9/2008 | Skaaksrud et al. |
| 2008/0221913 A1 | 9/2008 | Cook et al. |
| 2008/0223940 A1 | 9/2008 | Lee et al. |
| 2008/0281719 A1 | 11/2008 | Hall et al. |
| 2008/0312991 A1 | 12/2008 | Bharadwaj et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0164390 A1 | 6/2009 | Caiman et al. |
| 2009/0173672 A1 | 7/2009 | Avant et al. |
| 2009/0187489 A1 | 7/2009 | Mallick et al. |
| 2009/0269760 A1 | 10/2009 | Samadpour |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2009/0327361 A1 | 12/2009 | Mills et al. |
| 2010/0004960 A1 | 1/2010 | Frankenberg et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100229 A1 | 4/2010 | Whitson et al. |
| 2010/0100497 A1 | 4/2010 | Kuebert et al. |
| 2010/0121689 A1 | 5/2010 | Wallace et al. |
| 2010/0185565 A1 | 7/2010 | Wade |

(56) References Cited

U.S. PATENT DOCUMENTS

| | | |
|---|---|---|
| 2010/0211426 A1 | 8/2010 | McClurg |
| 2010/0211444 A1 | 8/2010 | Spear |
| 2010/0228564 A1 | 9/2010 | Kharraz et al. |
| 2010/0235210 A1 | 9/2010 | Nadrotowicz, Jr. |
| 2010/0299278 A1 | 11/2010 | Kriss et al. |
| 2011/0004562 A1 | 1/2011 | Hennessy et al. |
| 2011/0022532 A1 | 1/2011 | Kriss |
| 2011/0060552 A1 | 3/2011 | Ono |
| 2011/0125665 A1 | 5/2011 | Kadaba |
| 2011/0238195 A1 | 9/2011 | Nagy et al. |
| 2011/0270714 A1 | 11/2011 | Myrick et al. |
| 2011/0320308 A1 | 12/2011 | Dearlove et al. |
| 2012/0016948 A1 | 1/2012 | Sinha |
| 2012/0030133 A1 | 2/2012 | Rademaker |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0173308 A1 | 7/2012 | Brown et al. |
| 2012/0173448 A1 | 7/2012 | Rademaker |
| 2012/0179622 A1 | 7/2012 | Amato |
| 2012/0208559 A1 | 8/2012 | Svendsen et al. |
| 2012/0235791 A1 | 9/2012 | Donlan et al. |
| 2012/0246077 A1 | 9/2012 | Skaaksrud et al. |
| 2012/0303538 A1 | 11/2012 | Marcus et al. |
| 2012/0303539 A1 | 11/2012 | Marcus et al. |
| 2012/0303540 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2013/0006731 A1 | 1/2013 | Cook et al. |
| 2013/0006777 A1 | 1/2013 | Krishnareddy et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0024525 A1 | 1/2013 | Brady et al. |
| 2013/0054054 A1 | 2/2013 | Tollenaere et al. |
| 2013/0066744 A1 | 3/2013 | Higgins et al. |
| 2013/0073336 A1 | 3/2013 | Heath |
| 2013/0113819 A1 | 5/2013 | Gurusamy |
| 2013/0144428 A1 | 6/2013 | Irwin et al. |
| 2013/0212037 A1 | 8/2013 | Briggman et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262336 A1 | 10/2013 | Wan et al. |
| 2013/0275328 A1 | 10/2013 | Klingenberg et al. |
| 2013/0291079 A1 | 10/2013 | Lowe et al. |
| 2014/0052661 A1 | 2/2014 | Shakes et al. |
| 2014/0180959 A1 | 6/2014 | Gillen et al. |
| 2014/0222711 A1 | 8/2014 | Tibbs et al. |
| 2014/0266668 A1 | 9/2014 | Blankenship et al. |
| 2015/0081587 A1 | 3/2015 | Gillen |
| 2015/0134560 A1 | 5/2015 | Krishnaiahsetty |
| 2015/0154559 A1 | 6/2015 | Barbush et al. |
| 2015/0242811 A1 | 8/2015 | Gillen et al. |
| 2015/0262125 A1 | 9/2015 | Sager et al. |
| 2016/0189098 A1* | 6/2016 | Beaurepaire ........ H04W 12/084 705/337 |
| 2017/0017920 A1* | 1/2017 | Stark ................ G06K 19/06037 |

FOREIGN PATENT DOCUMENTS

| | | |
|---|---|---|
| CN | 102567883 A | 7/2012 |
| DE | 19644163 A1 | 5/1998 |
| DE | 10007897 C1 | 6/2001 |
| GB | 2483220 A | 3/2012 |
| JP | H10207956 A | 8/1998 |
| JP | 11-139540 A | 5/1999 |
| JP | 2000-339373 A | 12/2000 |
| JP | 2001-14393 A | 1/2001 |
| JP | 2001-22678 A | 1/2001 |
| JP | 2002-42008 A | 2/2002 |
| JP | 2002-56307 A | 2/2002 |
| JP | 2005-213020 A | 8/2005 |
| JP | 2006-206225 A | 8/2006 |
| TW | 201220221 A | 5/2012 |
| WO | 00/19170 A1 | 4/2000 |
| WO | 00/19171 A1 | 4/2000 |
| WO | 00/30014 A1 | 5/2000 |
| WO | 00/46726 A2 | 8/2000 |
| WO | 00/46728 A2 | 8/2000 |
| WO | 00/52422 A1 | 9/2000 |
| WO | 01/16889 A1 | 3/2001 |
| WO | 01/29778 A1 | 4/2001 |
| WO | 01/35344 A2 | 5/2001 |
| WO | 01/39031 A2 | 5/2001 |
| WO | 01/65451 A1 | 9/2001 |
| WO | 01/65454 A2 | 9/2001 |
| WO | 01/65523 A1 | 9/2001 |
| WO | 01/65524 A1 | 9/2001 |
| WO | 01/67344 A1 | 9/2001 |
| WO | 01/72109 A2 | 10/2001 |
| WO | 01/84359 A2 | 11/2001 |
| WO | 01/88831 A2 | 11/2001 |
| WO | 01/97101 A2 | 12/2001 |
| WO | 02/07104 A1 | 1/2002 |
| WO | 02/17045 A2 | 2/2002 |
| WO | 02/052378 A2 | 7/2002 |
| WO | 03/034293 A1 | 4/2003 |
| WO | 2004/015518 A2 | 2/2004 |
| WO | 2005/105329 A1 | 11/2005 |
| WO | 2011/017286 A2 | 2/2011 |
| WO | 2011/150971 A1 | 12/2011 |
| WO | 2012/045182 A1 | 4/2012 |
| WO | 2012/129529 A1 | 9/2012 |
| WO | 2012/135143 A2 | 10/2012 |
| WO | 2012/161728 A1 | 11/2012 |
| WO | 2012/161730 A2 | 11/2012 |
| WO | 2012/161731 A2 | 11/2012 |
| WO | 2012/161732 A2 | 11/2012 |

OTHER PUBLICATIONS

"ASP V16-System Walker List Works Manual", line 5, 3.4 Start up and termination of ListWORKS writer, p. 88.

Brewin et al., "Follow that Package!", Article, ComputerWorld, Available online at: <www.computerworld.com/printthis/2001/0,4814,58696,00.html>, Mar. 19, 2001, pp. 1-5.

Business Wire,"Many Happy Returns—UPS Unveils Advanced Outline Returns Solution", Accession No. 12921102, Business Wire, Sep. 20, 2000, 3 pages.

Caminiti et al., "United Parcel Service Introduces Advanced Label Imaging System", Business Wire, Section 1, Nov. 29, 1989, pp. 1-3.

Declaration of David Ellison pertaining to UPS and Mailbox etc., pre-filing activities, Mar. 2001-Nov. 1, 2002.

DeMarco, Donna, "E-tail Presents Can be Tougher to Send Back than Order", Journal, Knight-Ridder/Tribune Business News, The Dialog Corporation, US, Dec. 28, 1999, 2 pages.

El Portal Del Transporte, "Fedex Insight Empowers Customers with Enhanced Shipment Visibility and Control", Article, Available online at: <http://www.transportando.net/newsabril_completa.htm>, Apr. 11, 2001, pp. 9-10.

FedEx, "FedEx Mobile Ship", Available online at: <http://www.fedex.com/us/mobile/label.html>, redirected to <http://mobilesolutions.fedex.com/shipping-label.html>, Retrieved on Sep. 25, 2013, 2 pages.

FedEx, "RPS Adds Automated Package Pick-up to Redesigned Web Site", Available online at: <www.fedex.com/us/about/ground/pressreleases/pressrelease111198.html?link=4>, Retrieved on Sep. 10, 2003. 1 page.

Frontline Solutions, Fed Ex "Improves Internal, External Operations", Article, Fairfax, Virginia and Memphis, Tennessee, Available online at: <http://www.frintlinemagazine.com/art_th/04052001.htx>, Apr. 5, 2001, pp. 1-2.

Gao et al., "Cyber-Physical-Social Systems: Harnessing the Crowd sourcing Power of Social Media for Disaster Relief", IEEE Intelligent Systems, IEEE Computer Society, 2011, pp. 10-14.

(56) References Cited

OTHER PUBLICATIONS

Harrington, Lisa, "The US Postal Service Gets Serious about Serving Business in the New Economy", Transportation & Distribution, vol. 41, No. 5, Penton Publishing, Inc., United States of America, May 2000, p. 2.
Henderson, Timothy P, "Buy.com Boosts Returns Process Efficiency with New Solution", ProQuest Info & Learning, vol. 82, No. 11, Nov. 2000, pp. 72-76.
Henderson, Timothy P., "Scheduling Software Helps Webvan Meet 30-Minute Delivery Window, Descartes", Available online at: <www.stores.org>, Jul. 2000, 2 pages.
Ipventure, "Schedule Distribution Routes and Timeslots", Available online at: <https://www.ipventure.com/onlineorder/distribution.php>, Retrieved on Apr. 16, 2008, 1 page.
Kihon, Kara J., "Made Business Seikou No Tameno Kanpeki Guide—How to E-Commerce", p. 60.
Lindsay, Bruce R., "Congressional Research Service, Social Media and Disasters: Current Uses, Future Options, and Policy Considerations", CRS Report for Congress, Congressional Research Service, Sep. 6, 2011, 10 pages.
Pender, Lee, "Hard Times are the Best Times", Magazine, Cio, Available online at: <www.cio.com/archive/081501/besttimes_content.html>, Aug. 15, 2001, pp. 3-7.
Raco Industries, "Increase Delivery Visibility and Simplify Your Process", Available online at: <http://www.racointeractive.com/media/834/raco_interactive-pd.pdf>, Retrieved on Sep. 25, 2013, 2 pages.
Quantum View Inbound, Quantum View Outbound, How Quantum View Outbound Works, Quantum View Service Options, Quantum View and UPS Administration, QuantumViewTM, Available at: <http://www.ups.com/iovs/ivs_learnmore.html>, Aug. 7, 2002, 15 pages.
Van Huzien, Gordon, "Messaging: The Transport Part of The XML Puzzle", IBM Developer Works, Article, Available online at: <http://www-106.ibm.com/developerworks/library/xml-messaging/>, Jul. 2000, 8 pages.

\* cited by examiner

| Time | Mondays | Tuesdays | Wednesdays | Thursdays | Fridays | Saturdays | Sundays | National Holidays |
|---|---|---|---|---|---|---|---|---|
| 7:00am – 9:00am | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 71 Lanier Islands Buford, GA 30518 USA | 71 Lanier Islands Buford, GA 30518 USA | 71 Lanier Islands Buford, GA 30518 USA |
| 9:00am – 5:00pm | 1201 W Peachtree Atlanta, GA 30309 USA | 1201 W Peachtree Atlanta, GA 30309 USA | 1201 W Peachtree Atlanta, GA 30309 USA | 1201 W Peachtree Atlanta, GA 30309 USA | 71 Lanier Islands Buford, GA 30518 USA | 71 Lanier Islands Buford, GA 30518 USA | 71 Lanier Islands Buford, GA 30518 USA | 71 Lanier Islands Buford, GA 30518 USA |
| 5:00pm – 9:00pm | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 71 Lanier Islands Buford, GA 30518 USA | 71 Lanier Islands Buford, GA 30518 USA | 71 Lanier Islands Buford, GA 30518 USA | 71 Lanier Islands Buford, GA 30518 USA |

FIG. 6

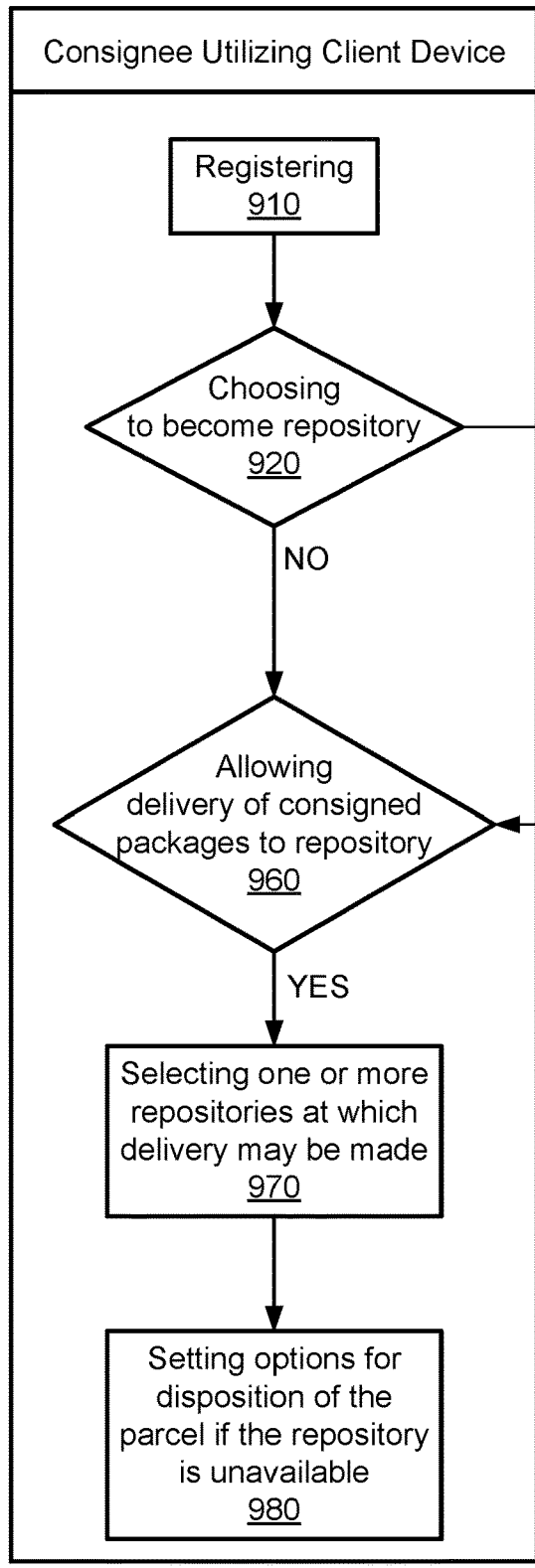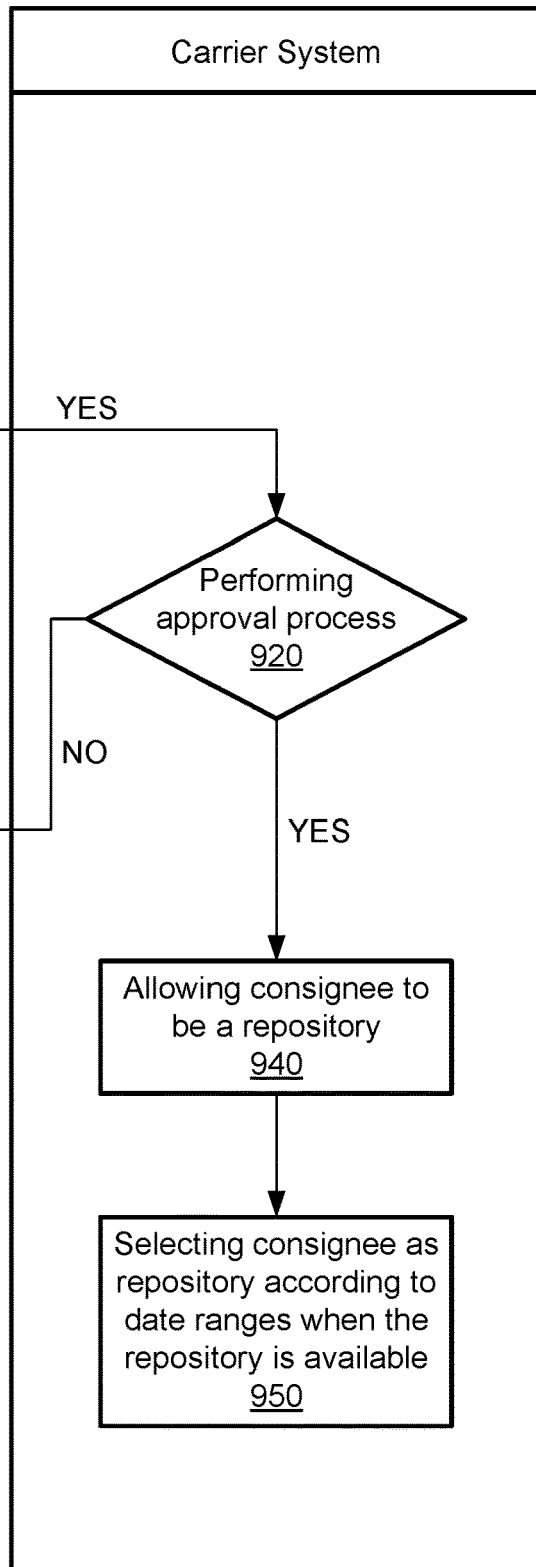
FIG. 9

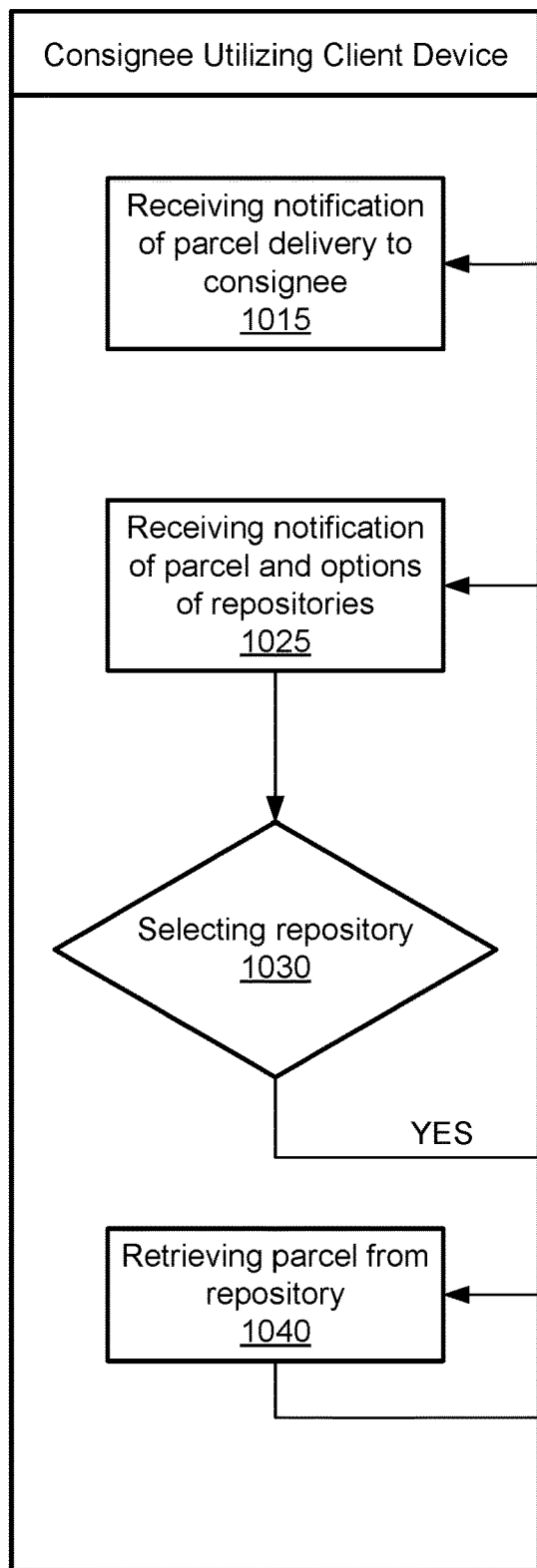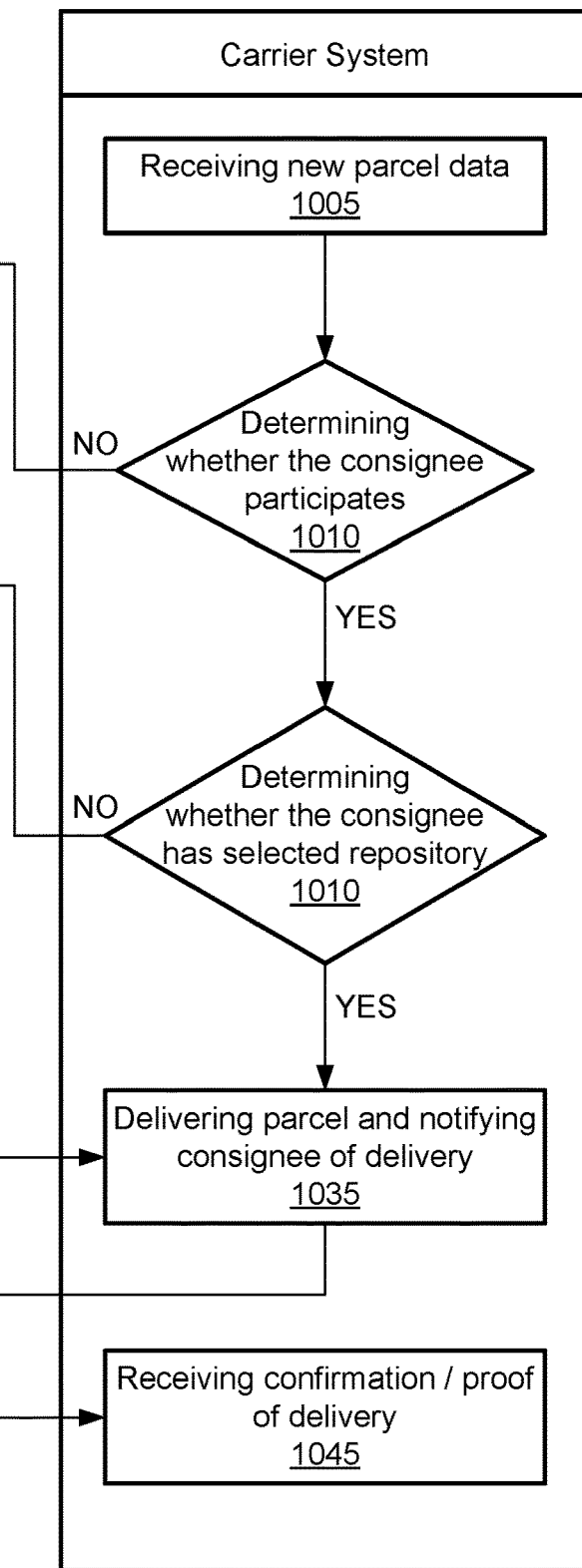
FIG. 10

DETERMINING ALTERNATIVE DELIVERY DESTINATIONS

CROSS-REFERENCE TO RELATED APPLICATIONS

This application claims priority to U.S. Non-Provisional application Ser. No. 14/640,753 filed Mar. 6, 2015, which also claims priority to U.S. Provisional Application No. 61/952,163 filed Mar. 13, 2014, the contents both of which are hereby incorporated by reference in their entirety.

BACKGROUND

Shipping customers are increasing their expectations regarding various delivery services and value. Thus, new concepts are needed to enhance customer experience and loyalty by improving delivery services and value. Carriers have long tried to optimize how parcel deliveries are scheduled with end consignees to both improve delivery time and lower costs for both the customer and carrier. For example, existing systems may allow consignees to redirect parcel during transit when the consignee knows they are going to be away from the delivery address instead of requiring the carrier to make a second trip. While these systems have merit they do not adequately address other issues/opportunities created by advancements in technology and continued evolution in consignee mobility. In this regard, areas for improving current systems have been identified. Through applied effort, ingenuity, and innovation, solutions to improve such systems have been realized and are described in connection with embodiments of the present invention.

BRIEF SUMMARY

In general, embodiments of the present invention provide systems, methods, apparatus, and computer program products for determining alternative delivery destinations, such as directing a scheduled delivery to an alternate consignee.

In some embodiments, a method may be provided for determining alternative delivery destinations, the method comprising receiving shipping information for an item, the shipping information indicating the item to be delivered to an original consignee by a carrier and comprising at least a default delivery location, and determining whether the original consignee has indicated a first priority alternative consignee among one or more alternative consignees. In some embodiments, the method may further comprise in an instance in which a determination is made that the original consignee has indicated the first priority alternative consignee among the one or more alternative consignees, delivering the item to the first priority alternative consignee.

In some embodiments, the method may further comprise determining, subsequent to the reception of the shipping information for the item, whether the original consignee has elected to enable shipments to be delivered to at least one alternative consignee, and in an instance in which the original consignee has not elected to enable shipments to be delivered to at least one alternative consignee, providing a user interface configured to notify the original consignee of the item and allow one of registration or a single-time selection of the first priority alternative consignee. In some embodiments, the method may further comprise determining, subsequent to the reception of the shipping information for the item, whether the original consignee has elected to enable shipments to be delivered to at least one alternative consignee, and in an instance in which the original consignee has elected to enable shipments to be delivered to at least one alternative consignee, determining the first priority alternative consignee.

In some embodiments, the method may further comprise determining whether the first priority alternative consignee is available to receive the item, in an instance in which the first priority alternative consignee is not available to receive the item, delivering the item to the first priority alternative consignee, in an instance in which the first priority alternative consignee is not available to receive the item, determining a second priority alternative consignee, determining whether the second priority alternative consignee is available to receive the item, and in an instance in which the second priority alternative consignee is available to receive the item, delivering the item to the second priority alternative consignee. In some embodiments, the method may further comprise providing, via the network, to the client device, notification that the item was delivered, the notification comprising information indicative of which of the one or more alternative consignees to which the item was delivered, providing, via the network, to the client device, a user interface configured to receive confirmation.

In some embodiments, the method may further comprise providing, [sic] via the network, to the client device, a user interface configured to enable the original consignee to indicate that the shipment should be delivery to the default location. In some embodiments, the method may further comprise providing, [sic] via the network, to the client device, a user interface configured to enable the original consignee to register as one of the one or more alternative consignees, enabling other original consignees to select the original consignee as one of their alternative consignees.

In some embodiments, an apparatus for determining alternative delivery destinations may be provided, the apparatus comprising at least one processor and at least one memory including program code, the at least one memory and the program code configured to, with the processor, cause the apparatus to at least receive shipping information for an item, the shipping information indicating the item to be delivered to an original consignee by a carrier and comprising at least a default delivery location, and determine whether the original consignee has indicated a first priority alternative consignee among one or more alternative consignees.

In some embodiments, the memory and program code are further configured to, with the processor, cause the apparatus to in an instance in which a determination is made that the original consignee has indicated the first priority alternative consignee among the one or more alternative consignees, deliver the item to the first priority alternative consignee. In some embodiments, the memory and program code are further configured to, with the processor, cause the apparatus to determine, subsequent to the reception of the shipping information for the item, whether the original consignee has elected to enable shipments to be delivered to at least one alternative consignee, and in an instance in which the original consignee has not elected to enable shipments to be delivered to at least one alternative consignee, provides user interface configured to notify the original consignee of the item and allow one of registration or a single-time selection of the first priority alternative consignee.

In some embodiments, the memory and program code are further configured to, with the processor, cause the apparatus to determine, subsequent to the reception of the shipping information for the item, whether the original consignee has elected to enable shipments to be delivered to at least one alternative consignee, and in an instance in which the original consignee has elected to enable shipments to be delivered to at least one alternative consignee, determine the first priority alternative consignee. In some embodiments, the memory and program code are further configured to, with the processor, cause the apparatus to determine whether the first priority alternative consignee is available to receive the item, in an instance in which the first priority alternative consignee is not available to receive the item, deliver the item to the first priority alternative consignee, in an instance in which the first priority alternative consignee is not available to receive the item, determine a second priority alternative consignee, determine whether the second priority alternative consignee is available to receive the item, and in an instance in which the second priority alternative consignee is available to receive the item, deliver the item to the second priority alternative consignee.

In some embodiments, the memory and program code are further configured to, with the processor, cause the apparatus to provide, via the network, to the client device, notification that the item was delivered, the notification comprising information indicative of which of the one or more alternative consignees to which the item was delivered, and provide, via the network, to the client device, a user interface configured to receive confirmation.

In some embodiments, the memory and program code are further configured to, with the processor, cause the apparatus to provide, [sic] via the network, to the client device, a user interface configured to enable the original consignee to indicate that the shipment should be delivery to the default location.

In some embodiments, the memory and program code are further configured to, with the processor, cause the apparatus to provide, [sic] via the network, to the client device, a user interface configured to enable the original consignee to register as one of the one or more alternative consignees, enabling other original consignees to select the original consignee as one of their alternative consignees.

In some embodiments, a computer program product for determining alternative delivery destinations may be provided, the computer program product comprising at least one non-transitory computer-readable storage medium having computer-readable program code portions stored therein, the computer-readable program code portions comprising an executable portion configured to receive shipping information for an item, the shipping information indicating the item to be delivered to an original consignee by a carrier and comprising at least a default delivery location, and an executable portion configured to determine whether the original consignee has indicated a first priority alternative consignee among one or more alternative consignees.

In some embodiments, the computer program product may further comprise an executable portion configured to, in an instance in which a determination is made that the original consignee has indicated the first priority alternative consignee among the one or more alternative consignees, deliver the item to the first priority alternative consignee. In some embodiments, the computer program product may further comprise an executable portion configured to determine, subsequent to the reception of the shipping information for the item, whether the original consignee has elected to enable shipments to be delivered to at least one alternative consignee, and an executable portion configured to, in an instance in which the original consignee has not elected to enable shipments to be delivered to at least one alternative consignee, provide a user interface configured to notify the original consignee of the item and allow one of registration or a single-time selection of the first priority alternative consignee.

In some embodiments, the computer program product may further comprise an executable portion configured to determine, subsequent to the reception of the shipping information for the item, whether the original consignee has elected to enable shipments to be delivered to at least one alternative consignee, and an executable portion configured to, in an instance in which the original consignee has elected to enable shipments to be delivered to at least one alternative consignee, determine the first priority alternative consignee.

In some embodiments, the computer program product may further comprise an executable portion configured to determine whether the first priority alternative consignee is available to receive the item, an executable portion configured to, in an instance in which the first priority alternative consignee is not available to receive the item, deliver the item to the first priority alternative consignee, an executable portion configured to, in an instance in which the first priority alternative consignee is not available to receive the item, determine a second priority alternative consignee, an executable portion configured to determine whether the second priority alternative consignee is available to receive the item, and an executable portion configured to, in an instance in which the second priority alternative consignee is available to receive the item, deliver the item to the second priority alternative consignee. In some embodiments, the computer program product may further comprise an executable portion configured to provide, via the network, to the client device, notification that the item was delivered, the notification comprising information indicative of which of the one or more alternative consignees to which the item was delivered, and an executable portion configured to provide, via the network, to the client device, a user interface configured to receive confirmation.

In some embodiments, the computer program product may further comprise an executable portion configured to provide, [sic] via the network, to the client device, a user interface configured to enable the original consignee to indicate that the shipment should be delivery to the default location. In some embodiments, the computer program product may further comprise an executable portion configured to provide, [sic] via the network, to the client device, a user interface configured to enable the original consignee to register as one of the one or more alternative consignees, enabling other original consignees to select the original consignee as one of their alternative consignees.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 shows exemplary input and output of various embodiments of the present invention;

FIGS. 9-11 show flowcharts illustrating operations and processes that can be used in accordance with various embodiments of the present invention.

DETAILED DESCRIPTION

Figure 1:
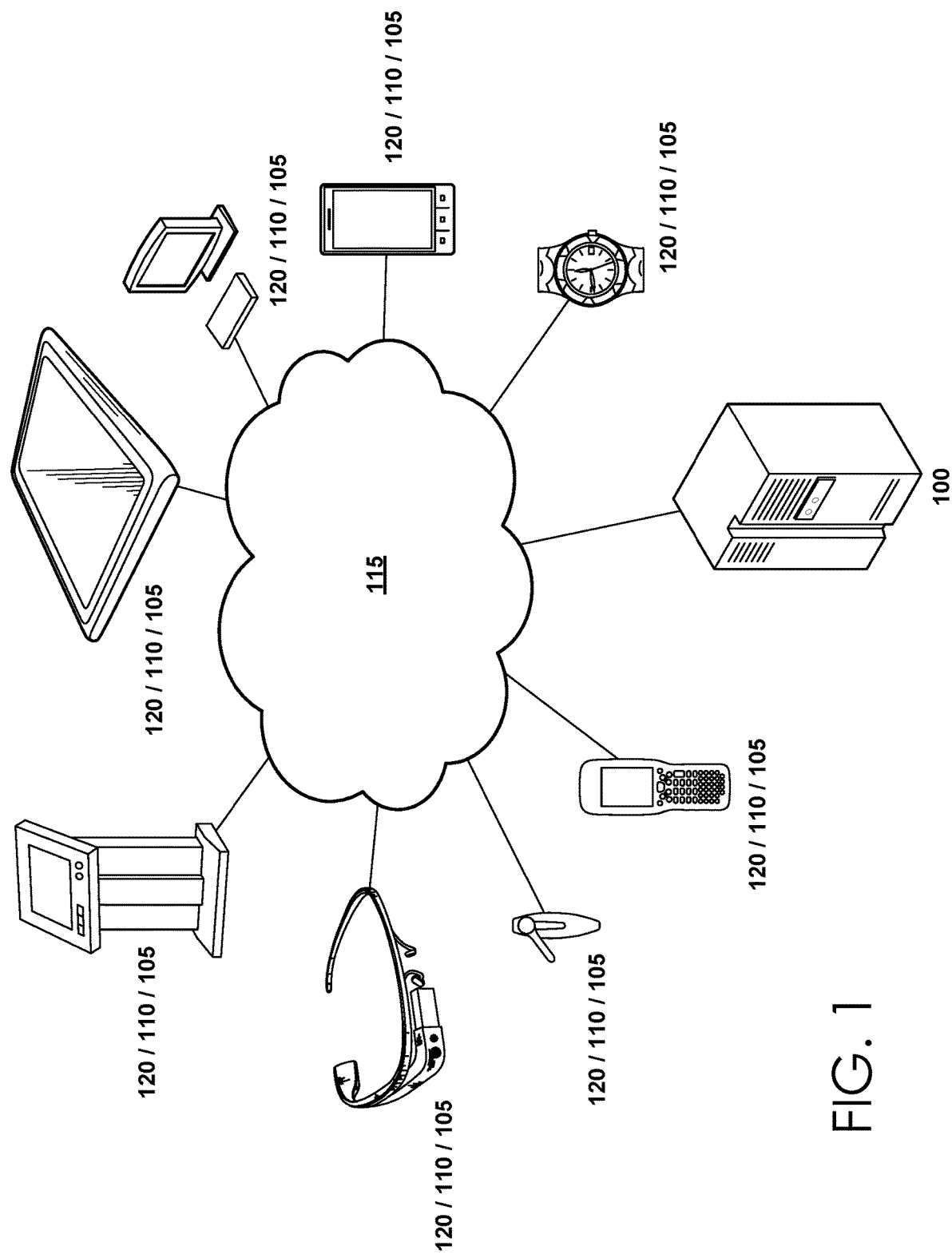
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more carrier systems 100, one or more mobile stations 105, one or more consignee computing devices 110, and one or more networks 115, and one or more consignor computing devices 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

Figure 2:
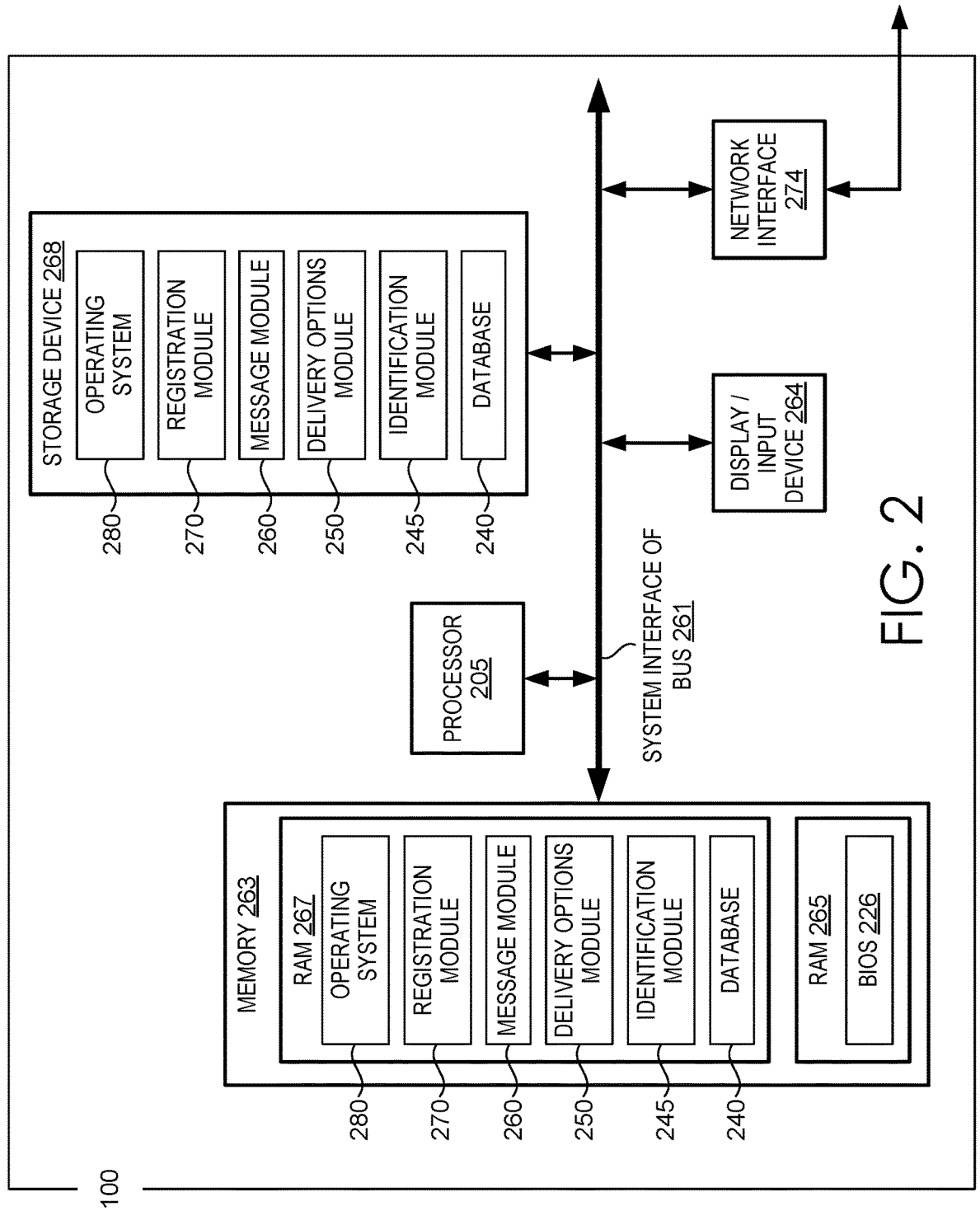
FIG. 2 is an exemplary schematic diagram of a carrier system according to one embodiment of the present invention.

FIG. 2 provides an exemplary schematic of a carrier system 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the term "system" may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. However, the carrier system 100 may also comprise various other systems, such as an Address Matching System (AMS), an Internet Membership System (IMS), a Customer Profile System (CPS), a Package Center information/data System (PCIS), a Customized Pick-up and Delivery System (CPAD), a Web Content Management System (WCMS), a Notification Email System (NES), a Fraud Prevention System (FPS), and a variety of other systems and their corresponding components. The carrier system 100 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

As will be understood from FIG. 1, in one embodiment, the carrier system 100 includes one or more processors 205 that communicate with other elements within the carrier system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory (RAM) 267 and read only memory (ROM) 265. The carrier system's ROM 265 may be used to store a basic input/output system (BIOS) 226 containing the basic routines that help to transfer information/data to the different elements within the carrier system 100.

In addition, in one embodiment, the carrier system 100 may include at least one storage device 268, such as a hard disk drive, a CD drive, and/or an optical disk drive for storing information/data on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, an alert module 260, a delivery options module 250, an identification module 245, a service schedule module, and/or the like. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

Also located within the carrier system 100, in one embodiment, is a network interface 274 for interfacing with various computing entities (e.g., with one or more mobile stations 105). For example, the carrier system 100 may be able to receive data and/or messages from and transmit data and/or messages to the mobile station 105, consignee computing devices 110, and consignor computing devices 120. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, near field communication (NFC) protocols, wireless universal serial bus (USB) protocols, and/or any other wireless protocol.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Station

Figure 3:
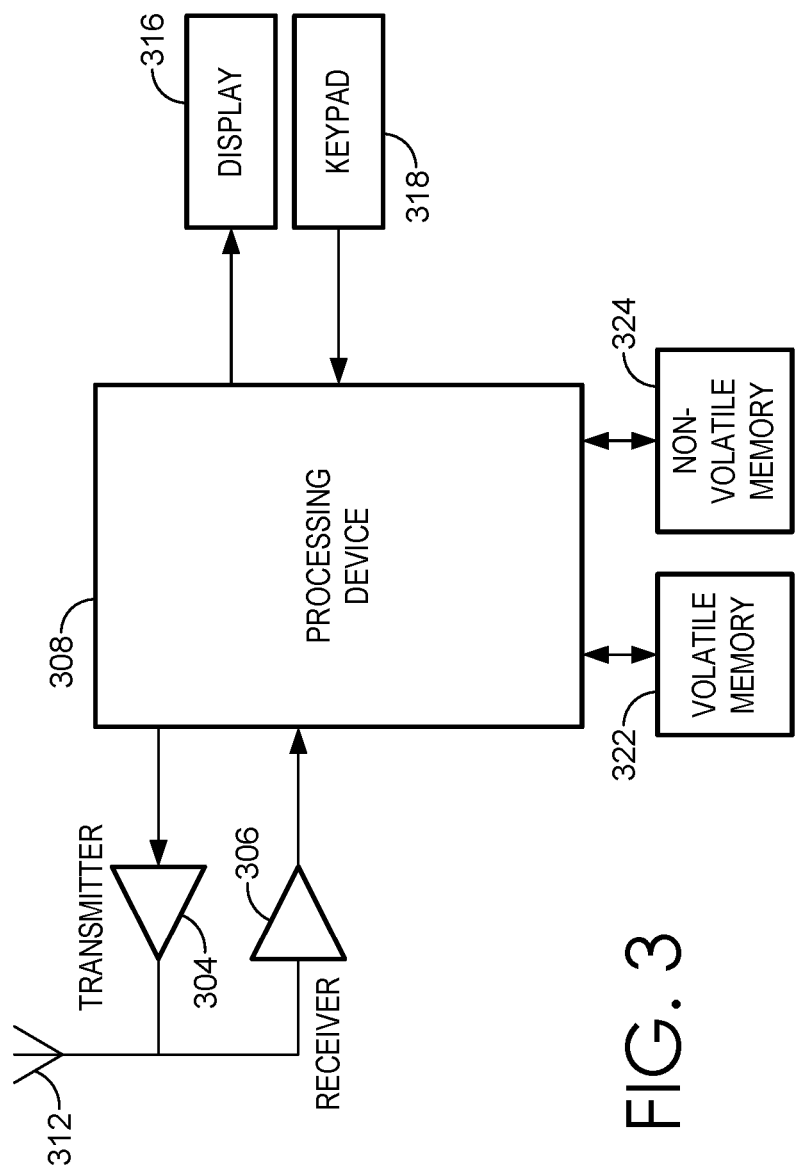
FIG. 3 is an exemplary schematic diagram of a mobile station according to one embodiment of the present invention.

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information/data in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols (e.g., using a Gobi radio), such as such as 802.11, GPRS, UMTS, CDMA2000, 1×RTT, WCDMA, TD-SCDMA, LTE, E-UTRAN, EVDO, HSPA, HSDPA, Wi-Fi, WiMAX, UWB, IR, Bluetooth™, NFC, wireless USB protocols, and/or any other wireless protocol and/or multiple wireless carriers. To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include a location determining device and/or functionality. For example, the mobile station 105 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information/data and data used by the mobile station 105 to implement the functions of the mobile station 105. The memory can also store content, such as computer program code for an application and/or other computer programs.

3. Exemplary Consignee Computing Device

The consignee computing devices 110 may each include one or more components that are functionally similar to those of the carrier system 100 and/or mobile station 105. For example, in one embodiment, each of the consignee computing devices may include: (1) a processor that communicates with other elements via a system interface or bus; (2) a user interface; (3) transitory and non-transitory memory; and (4) a communications interface. As noted, the consignee computing device 110 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignee computing device 110 to interact with and/or cause display of information/data from the carrier system 100, as described herein. These architectures are provided for exemplary purposes only and are not limiting to the various embodiments. In general, the terms device, system, computing entity, entity, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. A customer may refer to either a consignor (e.g., a party shipping an item via carrier) or a consignee (e.g., a party receiving an item from a carrier). In the returns context, a consignee who received an item can become a consignor when returning an item.

4. Exemplary Consignor Computing Device

The consignor computing devices 120 may each include one or more components that are functionally similar to those of the carrier system 100, mobile station 105, and/or consignee computing device 110. For example, in one embodiment, each of the consignor computing devices may include: (1) a processor that communicates with other elements via a system interface or bus; (2) a user interface; (3) transitory and non-transitory memory; and (4) a communications interface. As noted, the consignor computing device 120 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignor computing device 120 to interact with and/or cause display of information/data from the carrier system 100, as described herein. These architectures are provided for exemplary purposes only and are not limiting to the various embodiments. A customer may refer to a consignor (e.g., a party shipping an item via carrier), a consignee (e.g., a party receiving an item from a carrier) a third party, and/or the like. In the returns context, a consignor who shipped an item can become a consignee when an item is being returned.

III. EXEMPLARY SYSTEM OPERATION

Reference will now be made to FIGS. 4-11. FIGS. 4, 5, 7, and 9-11 are flowcharts illustrating operations and processes that may be performed for customer controlled management of shipments. FIGS. 6, 8A, and 8B show exemplary input and output for determining alternative delivery destinations, such as directing a scheduled delivery to an alternate consignee.

1. Registration Process

Figure 4:
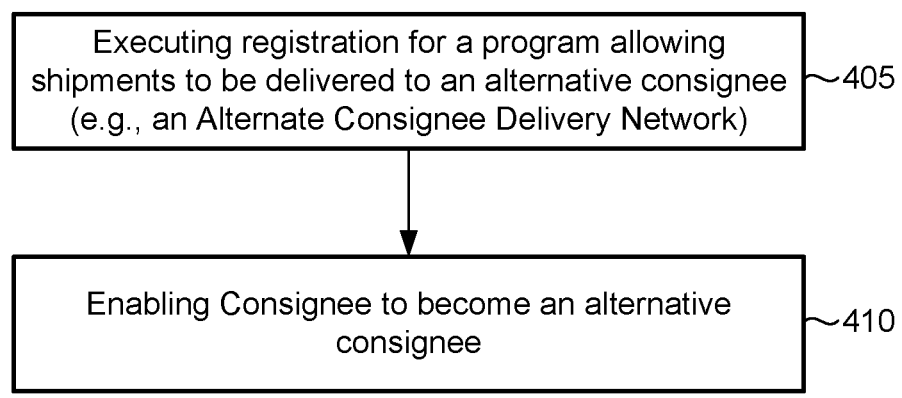
FIGS. 4 and 5 show flowcharts illustrating operations and processes that can be used in accordance with various embodiments of the present invention.
Figure 5:
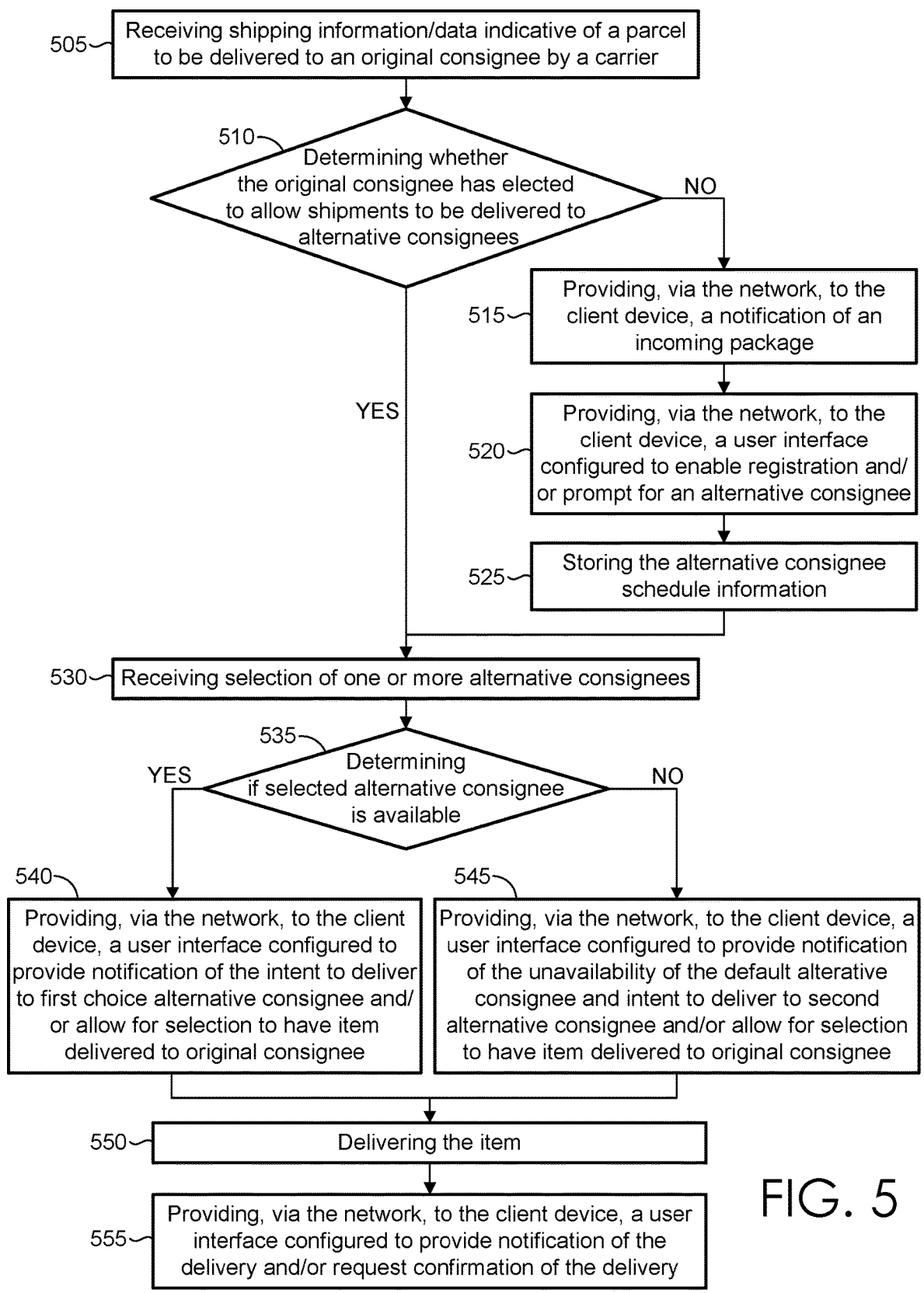

FIG. 4 shows a flowchart illustrating a process that may be performed by a carrier system to register and/or enroll a customer (e.g., e.g., consignor, consignee, third party, and/or the like) into a program enabling alternative delivery destinations, such as, for example, an "Alternate Consignee Delivery Network" or the like. FIG. 5 then shows a flowchart illustrating a process that may be performed by a carrier system to enable a customer (e.g., consignor, consignee, third party, and/or the like) to select alternative delivery destinations utilizing, for example, an "Alternate Consignee Delivery Network" or the like. Referring back to FIG. 4, as is shown in operation 405, an apparatus, such as the last mile carrier system or carrier system 100, may include means, such as the processor 205 or the like, for executing enrollment/registration for a program enabling/allowing shipments to be delivered to a repository/alternative consignee (e.g., an "Alternate Consignee Delivery Network").

A customer (e.g., consignor, consignee, third party, and/or the like) may be an individual, a family, a company, an organization, an entity, a department within an organization, a representative of an organization and/or person, and/or the like. To register, a customer (e.g., a customer or customer representative operating a consignee computing device 110 or consignor computing device 120) may access a webpage, application, dashboard, browser, or portal of a carrier, such as United Parcel Service of America, Inc. (UPS). For instance, the carrier system 100 may provide a webpage that provides the customer with an option of logging into a customer account or enrolling/registering for a customer pick-up, delivery, and/or returns program.

In one embodiment, as part of the enrollment/registration process, the customer (e.g., operating a consignee computing device 110 or consignor computing device 120) may be requested to provide biographic and/or geographic information/data by the carrier system 100 (e.g., via the registration module 270). Such information/data may be manually input or provided by allowing access to other accounts, such as Facebook, Gmail, Twitter, PayPal, and/or the like. For instance, the customer may provide the customer's name, such as a first name, a last name, a company name, an entity name, and/or an organization name. The customer may also provide any aliases associated with the customer. For instance, if the customer were an individual named Joseph Brown, the customer may provide Joe Brown or Joey Brown as aliases.

The customer may also provide one or more physical addresses associated with the customer (e.g., street address, city, state, postal code, and/or country) to the carrier system 100. For instance, Joseph Brown's primary residential address of 105 Main Street, Atlanta, Ga. 30309, USA, may be provided to the carrier system 100. Further, one or more secondary residential addresses may also be provided to the carrier system 100 for association with Mr. Brown's account and profile, such as 71 Lanier Islands, Buford, Ga. 30518, USA. As will be recognized, the residential addresses may include weekend residences, family member residences visited by the customer, and/or the like. Additionally, the customer may also provide one or more business addresses associated with the customer (e.g., street address, city, state, postal code, and/or country) to the carrier system 100. For example, Mr. Brown may have a primary business address of 1201 W Peachtree, Atlanta, Ga. 30309, USA. One or more secondary business addresses may also be provided to the carrier system 100 for association with Mr. Brown's account and profile, such as 101 South Tryon Street, Charlotte, N.C. 28280, USA; 950 F Street, NW, Washington, D.C. 20004, USA; and 90 Park Avenue, New York, N.Y. 10016, USA. As will be recognized, the business addresses may include various office locations for a single enterprise, multiple office locations for various enterprises, and/or the like. As will be recognized, the customer may provide other biographic and/or geographic information/data to adapt to various needs and circumstances.

In one embodiment, once the carrier system 100 receives the necessary biographic and/or geographic information/data from the customer, the carrier system 100 may perform one or more validation operations. For example, the carrier system 100 may determine whether the primary address (and/or other addresses) in the specified country or postal code is eligible for an "Alternate Consignee Delivery Network" or the like. The carrier system 100 may also determine whether the primary address (and/or other addresses) is valid, e.g., by passing the primary address through one or more address cleansing or standardization systems. The carrier system 100 may perform a variety of fraud prevention measures as well, such as determining whether the customer (e.g., consignor or consignee) or one of the customer's addresses has been "blacklisted" from customer pick-up, delivery, and/or returns programs. As will be recognized, a variety of other approaches and techniques can be used to adapt to various needs and circumstances.

In one embodiment, the carrier system 100 may create a customer profile for the customer via the enrollment/registration process. Accordingly, the carrier system 100 may create and store various customer profiles (e.g., via database 240). In addition to at least the information/data described above, a customer profile may include one or more corresponding usernames and passwords. As will be recognized, each of the physical addresses may be associated with the customer's profile.

In some embodiments, the carrier system 100, as part of the registration process or subsequent to the registration process, may enable the customer to enroll, apply to be, or otherwise become a repository and, if selected, an alternative consignee. Accordingly, as is shown in operation 410, an apparatus, such as the last mile carrier system or carrier system 100, may include means, such as the processor 205 or the like, for enabling registration as a repository and/or an alternative consignee. In some embodiments, a verification process and/or approval process, for example, similar to or in addition to that which was performed in the initial registration operation, may be performed prior to classifying the customer as a repository and/or enabling/allowing other customers to select the customer as an alternative consignee. For example, the last mile carrier system or carrier system 100 may include means, such as the processor 205 or the like, for verifying eligibility by way of, for example, a credit check, background check, cash deposit, or the like. Some embodiments may allow for, after selection, a subsequent rating and/or peer-review process by other customers.

In one embodiment, once the customer is registered as a repository and/or an alternative consignee, benefits or incentives may be afforded, such as, for example, discounts on future shipping costs and/or services (e.g., free customer pick-up or delivery, reduced cost and/or unlimited services, etc.) Moreover, once a customer is registered as a repository and/or an alternative consignee, the customer (e.g., operating a customer computing device 110/120) can provide various preferences associated with the customer program to the carrier system 100 via a webpage. For instance, the customer (e.g., operating a customer computing device 110/120) can provide a variety of preferences, such communication preferences, service schedule preferences, delivery preferences, and/or delivery options. The customer (e.g., operating a customer computing device 110/120) may also update any information/data through the appropriate interface (e.g., browser, dashboard, webpage, application). In some embodiments, the customer (e.g., operating a customer computing device 110/120) may also provide preferences regarding their unavailability to act as a repository/alternative consignee. For example, while the customer is on vacation or the like, packages may be unable to be received.

2. Determining and Selecting an Alternative Consignee

FIG. 5 shows a flowchart illustrating a process that may be performed by a carrier system 100 to enable a customer (e.g., consignors and/or consignees) to select one or more repositories as alternative delivery destinations utilizing, for example, an "Alternate Consignee Delivery Network" or the like. As is shown in operation 505, an apparatus, such as the last mile carrier system or carrier system 100, may include means, such as the processor 205 or the like, for generating or receiving shipping information/data (hereinafter "shipping information"), the shipping information/data indicative of an item to be delivered to a consignee by a carrier. In some embodiments, the shipping information/data may comprise at least a default delivery location, for example to an "original consignee"—including those associated with an automatic service schedule (see FIG. 6). In some embodiments, the shipping information/data may comprise an estimated time of delivery. For example, the default delivery location may be the address on a shipping label, as indicated by, for example, the consignor. An item may be any tangible and/or physical object. In one embodiment, an item/parcel may be or be enclosed in one or more packages, parcels, bags, containers, loads, crates, items banded together, vehicle parts, pallets, drums, the like, and/or similar words used herein interchangeably. Such items/parcels may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, an item may communicate send "to" address information/data, received "from" address information/data, unique identifier codes, and/or various other information/data. Once shipping information/data is generated and/or received, delivery may be arranged.

In some embodiments, the shipping information/data may further include information/data about the item, such as delivery service level. For example, the delivery service level may be Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. The shipping data may include information/data about the party shipping the item (e.g., consignor), such as the party's address, the party's phone number, the party's return address, the party's name, and/or the like. The shipping information/data may also include information/data about the customer to whom the item is to be delivered (e.g., consignee), such as the customer's physical address or location (e.g., delivery point/ location), the customer's virtual address, the customer's phone number, the customer's name, and/or the like. As will be recognized, the terms delivery point/location are intended encompass any identifiable location, including residences, commercial locations, stores, vehicles, boats, landmarks, and/or the like.

In one embodiment, the shipping information/data may include information/data about the item itself and any tracking information. The tracking information/data may reflect the item's movement in the carrier's transportation network, including an expected pick-up or delivery date and time. To reflect the item's movement, an item/shipment identifier associated with the item may be scanned or otherwise electronically read at various points as the item is transported through the carrier's transportation network. For example, the item/shipment identifier may be automatically scanned by a barcode or MaxiCode device, an RFID interrogator, by a camera controller, or by a carrier employee using a handheld device (e.g., mobile station 105). In one embodiment, each time the item/shipment identifier is scanned or read, an appropriate device can transmit the item/shipment identifier and other appropriate information/ data (e.g., location and time of the scan or reading) to the carrier system 100. The carrier system 100 can then receive and use the information/data to track the item as it is transported though the carrier's transportation network and update the shipping information/data accordingly.

To arrange delivery, according to some embodiments discussed herein, the carrier system 100 may be configured to determine whether the original consignee has registered for the, for example, "Alternate Consignee Delivery Network" or otherwise elected to allow shipments to be delivered to alternative consignees. Accordingly, as is shown in operation 510, an apparatus, such as the last mile carrier system or carrier system 100, may include means, such as the processor 205 or the like, for determining, subsequent to the reception of the shipping information/data for the item, whether the original consignee has elected to enable shipments to be delivered to at least one alternative consignee. In some embodiments, in an instance in which the original consignee has not elected to enable shipments to be delivered to at least one alternative consignee, the last mile carrier system or carrier system 100, may include means, such as the processor 205 or the like, for providing a user interface configured to notify the original consignee of the item and allow one of registration or a single-time selection of a first priority alternative consignee.

For instance, when the consignee, has not registered or otherwise elected to allow shipments to be delivery to a repository/alternative consignee, the carrier system 100 may, for example, provide a user interface configured to implement the registration process described above with reference to FIG. 4. In other embodiments, the carrier system 100 may be configured to provide notification of the item, and in some embodiments, an estimated delivery date or the like, and allow the original consignee to select a repository/alternative consignee. Such notifications are described in greater detail in U.S. application Ser. No. 13/913,066, which is hereby incorporated in its entirety by reference. As such, as is shown in operation 515, an apparatus, such as the last mile carrier system or carrier system 100, may include means, such as the processor 205 or the like, for providing, via the network, to the client device, a notification of an item which is addressed to the original consignee. Furthermore, as is shown in operation 520, an apparatus, such as the last mile carrier system or carrier system 100, may include means, such as the processor 205 or the like, for providing, via the network, to the client device, a user interface configured to enable registration and/or prompt for selection of a repository/alternative consignee. That is, the carrier system 100 may provide the user interface and allow for the original consignee to register for the, for example, "Alternate Consignee Delivery Network," thus creating a customer profile or updating an existing customer profile, or on a one-time basis, elect a repository/ alternative consignee. As is shown in operation 525, an apparatus, such as the last mile carrier system or carrier system 100, may include means, such as the processor 205 or the like, for storing information/data regarding the selection of a repository/alternative consignee. For example, the information/data may be stored in, for example, a newly created customer profile or an updated customer profile. In one embodiment, once a customer (e.g., the original consignee) profile has been created by the carrier system 100, each of one or more items to be delivered to, picked up from, and/or returned from the customer can be identified as corresponding to the customer, and as such, may be delivered to, picked up from, and/or returned from a repository/alternative consignee.

Referring back to operation 510, the carrier system 100 may be configured for determining, subsequent to the reception of the shipping information/data for the item, whether the original consignee has elected to enable shipments to be delivered to at least one alternative consignee, such as by determining if the customer is registered in the "Alternate Consignee Delivery Network" or has otherwise elected to allow shipments to be delivered to alternative consignees. In an instance in which the original consignee has elected to enable shipments to be delivered to at least one alternative consignee, the carrier system 100 may be configured for determining the first priority alternative consignee, by for example, determining, first, if one or more alternative consignees have been selected, and if not, receiving selection of one or more alternative consignees, and/or what priority levels have been assigned to and/or associated with each of the selected alternative assignees. Similarly, once a customer has undergone the registration process or otherwise been notified by the carrier system of the item and been provided with functionality enabling them to allow the item to be delivered to alternative consignee, the carrier system may be configured for receiving selection of one or more alternative consignees. Accordingly, as is shown in operation 530, an apparatus, such as the last mile carrier system or carrier system 100, may include means, such as the processor 205 or the like, for receiving selection of one or more alternative consignees.

FIG. 6 shows exemplary service schedule information/data identifying the selected alternative consignee by address that may be associated with a particular customer (e.g., consignee or consignor). As shown in FIG. 6, a customer (e.g., operating a consignee computing device 110 or consignor computing device 120) may provide alternative consignees to which items should be delivered for each day of the week (including holidays) and/or for certain time periods during those days. For example, this particular customer on Mondays, Tuesdays, Wednesdays, and Thursdays (a) between 7:00 am-9:00 am and 5:00 pm-9:00 pm should be made at 105 Main Street, Atlanta, Ga. 30309, USA, and (b) between 9:00 am-5:00 pm should be made at 1201 W Peachtree, Atlanta, Ga. 30309, USA. Pick-ups from or deliveries on Fridays (a) between 7:00 am-9:00 am should be made at 105 Main Street, Atlanta, Ga. 30309, USA, and (b) between 9:00 am-9:00 pm should be made at 71 Lanier Islands, Buford, Ga. 30518, USA. And pick-ups from or deliveries on Saturdays, Sundays, or national holidays should be made at 71 Lanier Islands, Buford, Ga. 30518, USA.

After receiving the selection of a repository as an alternative consignee (e.g., provided by a customer operating an appropriate computing device 110/120), the carrier system 100 can update the appropriate customer profile to reflect that items to be picked up from and/or delivered to the customer should be in accordance with the service schedule (e.g., the customer's preferences or requests). As noted, such service schedules may be based on other considerations, factors, criteria, and similar words used herein interchangeably as well, such as months of the year, delivery instructions, delivery service levels, seasons, weather conditions for the pick-up or delivery date/time, travel conditions for the pick-up or delivery date/time, environmental conditions for the pick-up or delivery date/time, safety conditions for the pick-up or delivery date/time, and/or the like. Such automatic services schedules can be used to deliver items in accordance with the preferences regardless of the physical address, date, time, and/or the like that were originally intended by the consignor, carrier, or consignee.

In some embodiments, the carrier system 100 may identify candidate alternative delivery consignees/locations (e.g., dynamic delivery locations described in U.S. patent application Ser. No. 14/556,972, which is hereby incorporated by reference) from which alternative consignees may be selected. In some embodiments, candidate alternative delivery consignees/locations may be determined and/or provided for selection based on a discount level, (e.g., city center located alternative consignees or those otherwise located in densely traveled locations may have a lower associated cost than those alternative consignees that would require rural delivery.

For example, as will be understood by those skilled in the art, a carrier accumulates shipment data associated with items to be delivered and assigns the items to delivery routes for transporting the items through one or more facilities in the carrier's delivery network. In addition, the carrier also creates a dispatch plan for performing the final delivery of the item from a facility to a delivery address. In some embodiments, before or during the generation of the dispatch plan, the carrier system 100 may identify candidate alternative delivery consignees/locations within the delivery route. Candidate alternative delivery consignees/locations may be identified by applying various business rules to the service stops along a delivery route as specified by a dispatch plan. In some embodiments, the business rule may specify that only service stops in which the estimated time at the stop exceeds a predetermined threshold or the number of deliveries associated with a given stop exceeds a threshold would be a candidate for an alternative delivery location/consignee. For example, the carrier system 100 may compare the stop duration data from the dispatch plan against a predetermined threshold. In some embodiments, a business rule may specify that a predetermined number of service stops within a predetermined distance threshold may, as a group, represent a candidate alternative delivery consignees/location (e.g., within a neighborhood, on same street, with a shopping center, etc.). In some embodiments, the business rules may specify that some or all commercial stops may be considered candidate alternative delivery consignees/locations or that all service stops may be candidate alternative delivery consignees/locations.

In some embodiments, some customers may have an account with the carrier which establishes a series of delivery preferences as generally described in U.S. application Ser. No. 14/025,893. These preferences may include a primary delivery address and one or more secondary delivery addresses as previously described. In some cases, the profile may associate certain addresses for delivery of items on certain days/times and deliveries to other addresses on other days/times. In the event a consignee has a customer profile, the carrier system 100 may identify candidate alternative delivery consignees/locations that are within a predetermined distance threshold from the primary and/or secondary addresses provided in the consignee's profile. In some embodiments, the carrier system 100 may identify candidate alternative delivery consignees/locations that are within a predetermined time threshold from the estimated delivery time for primary and/or secondary addresses provided in the consignee's profile.

In some embodiments, the carrier system 100 may identify which consignees are offered one or more of the identified dynamic delivery locations. In some embodiments, only consignees that have an account and/or customer profile with the carrier are qualified to be offered candidate alternative delivery consignees/locations. U.S. application Ser. No. 14/025,893, which is incorporated above by reference, describes systems and methods for registering for an account and how that account may operate.

In some embodiments, the carrier system 100 may use the location information/data to "pro-actively" identify candidate alternative delivery consignees/locations such as restaurants, retail stores, landmarks or other locations that are within a predetermine distance of the determined location of the customer and "pro-actively" notify the customer of this option (e.g., before the customer has selected a repository/alternative consignee). For example, the candidate alternative delivery consignees/locations may be communicated to the customer with the notification or when the customer accesses a web portal or the like. As discussed in greater detail in U.S. application Ser. No. 13/839,398 filed on Mar. 13, 2013, which is hereby incorporated by reference, the one or more carrier servers may use various algorithms to predict the location of a customer and offer these locations as candidate alternative delivery consignees/locations. In further embodiments, the candidate alternative delivery consignees/locations may be dynamic locations based on GPS information, social network account information/data or the like. For example, the customer may be shopping at nearby retail stores and request that the item is delivered to her location. The carrier service provider would then use the GPS location of the customer's mobile device 115/120, social network information/data including information/data about the customer and/or the customer's vehicle (which may be part of a vehicle social network) to locate the customer and make the delivery of the item.

In some embodiments, one or more repositories may be selected and, subsequently, each may be given a priority. For example, a customer's first choice of repository/alternative consignee may be given first priority while a customer's second choice may be given second priority. For example, priority may be based on cost (e.g., particular repositories/alternative consignees may be more cost effective to deliver to), value (e.g., particular repositories/alternative consignees may be closer to home/office and still provide a cost advantage over the home/office while not having the same cost advantage as someplace further away or harder to get to, etc.), availability (e.g., e.g., particular repositories/alternative consignees may be able to accept parcel/items that require non-standard or special handling or offer better/more convenient hours, etc.), convenience (e.g., particular repositories/alternative consignees may be located on a particular route, in a particular neighborhood, etc.), or the like.

Once the first priority alternative consignee is selected and identified, as is shown in operation 535, an apparatus, such as the last mile carrier system or carrier system 100, may include means, such as the processor 205 or the like, for determining if the first priority alternative consignee is available, for example, to receive the item. For instance, as described above with reference to FIG. 4, when a customer registers to be a repository, the customer may provide notification of time frames/window in which they are unavailable to receive items/parcels, packages, or the like. As such, here the carrier system may determine whether the repository selected as the alternative consignee selected by the original consignee has indicated availability, unavailability, or the like.

In an instance in which the first priority alternative consignee is not available to receive the item, the last mile carrier system or carrier system 100 may be configured to execute the process enabling delivery of the item to the first priority alternative consignee, whereas, in an instance in which the first priority alternative consignee is not available to receive the item, the last mile carrier system or carrier system 100 may be configured to determine a second priority alternative consignee. Once the second priority alternative consignee is identified, the last mile carrier system or carrier system 100 may be configured to determine whether the second priority alternative consignee is available to receive the item, and in an instance in which the second priority alternative consignee is available to receive the item, the last mile carrier system or carrier system 100 may be configured to execute the process enabling delivery of the item to the second priority alternative consignee. In some embodiments, the described process may continue as many times as necessary to locate an available alternative consignee (e.g., identifying a third priority alternative consignee, determining their availability etc.).

In some embodiments, as is shown in operation 540, an apparatus, such as the last mile carrier system or carrier system 100, may include means, such as the processor 205 or the like, for, in an instance in which the first priority alternative consignee is available, providing, via the network, to the client device, a user interface configured to provide notification of the intent to deliver to first choice alternative consignee and/or allow for selection to have item delivered to original consignee. That is, while the costumer may have registered for the "Alternate Consignee Delivery Network" or otherwise elected to allow shipments to be delivered to alternative consignees, the last mile carrier system or carrier system 100 may, in some embodiments, still provide the original consignee with functionality enabling them to receive the item/parcel.

In some embodiments, as is shown in operation 545, an apparatus, such as the last mile carrier system or carrier system 100, may include means, such as the processor 205 or the like, for, in an instance in which the first priority alternative consignee is not available, providing, via the network, to the client device, a user interface configured to provide notification of the unavailability of the default or first priority alternative consignee and, moreover, an intent to deliver the item/parcel to the second alternative consignee. Furthermore, in some embodiments, the last mile carrier system or carrier system 100, may include means, such as the processor 205 or the like, for, providing, via the network, to the client device, a user interface configured to allow a selection to have item delivered to original consignee. As is shown in operation 550, an apparatus, such as the last mile carrier system or carrier system 100, may include means, such as the processor 205 or the like, for executing the process enabling delivery of the item to the alternative consignee. As shown above, in some embodiments, the alternative consignee to which an item may be delivery may be the first priority alternative consignee, whereas in other embodiments, the alternative consignee to which the item may be delivered is the second/third/fourth priority alternative consignee.

Once delivery is made, notification may be sent. Specific processes performed are described in detail with reference to FIG. 7 below. Referring back to FIG. 5, as is shown in operation 555, an apparatus, such as the last mile carrier system or carrier system 100, may include means, such as the processor 205 or the like, for providing, via the network, to the client device, a user interface configured to provide notification that the item was delivered. In some embodiments, the notification may comprise information/data indicative of which of the one or more alternative consignees to which the item was delivered (e.g., to the first priority alternative consignee, or in the event the first priority alternative consignee was unavailable, to the second priority alternative consignee). Furthermore, an apparatus, such as the last mile carrier system or carrier system 100, may include means, such as the processor 205 or the like, for requesting confirmation of the delivery, such as by requesting and/or receiving a customer signature, photo, or the like. That is, when the original consignee retrieves the item from the repository/alternative consignee, the repository/alternative consignee may request and/or require the original consignee to acknowledge pick-up and/or, in some embodiments, additionally or alternatively, the consignor, the carrier system, and/or the last carrier system may request and/or require the original consignee to acknowledge pick-up.

Figure 7:
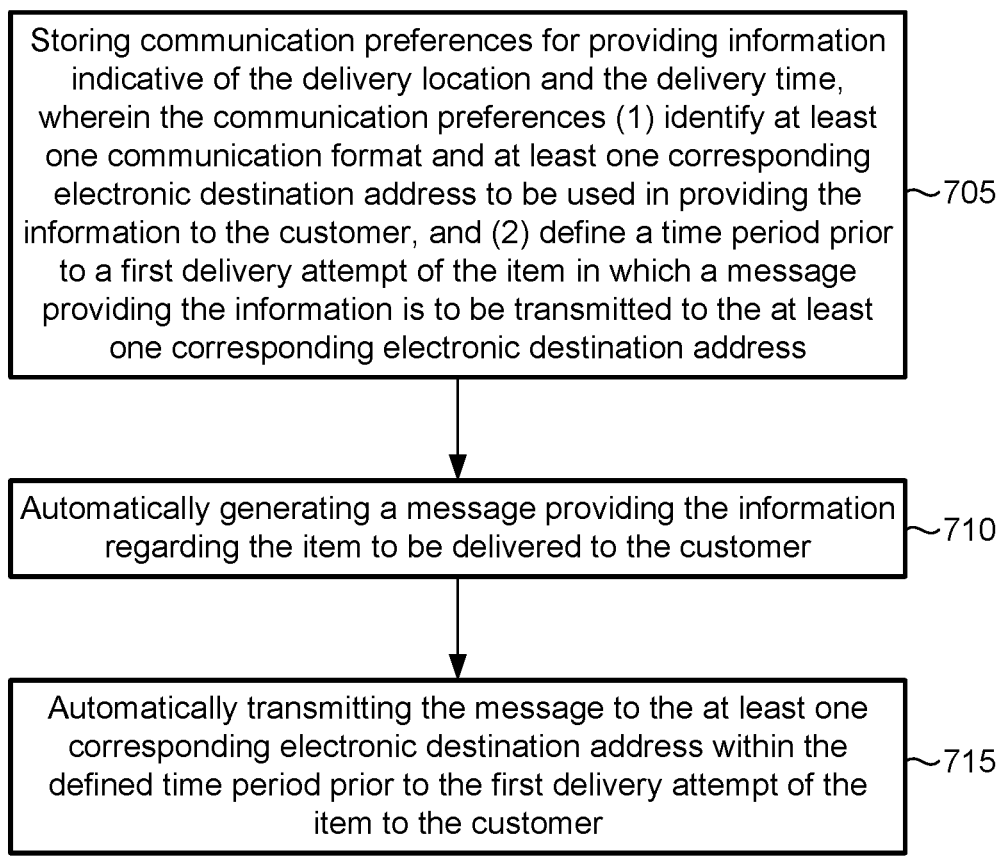
FIG. 7 shows a flowchart illustrating operations and processes that can be used in accordance with various embodiments of the present invention.
Figure 8B:
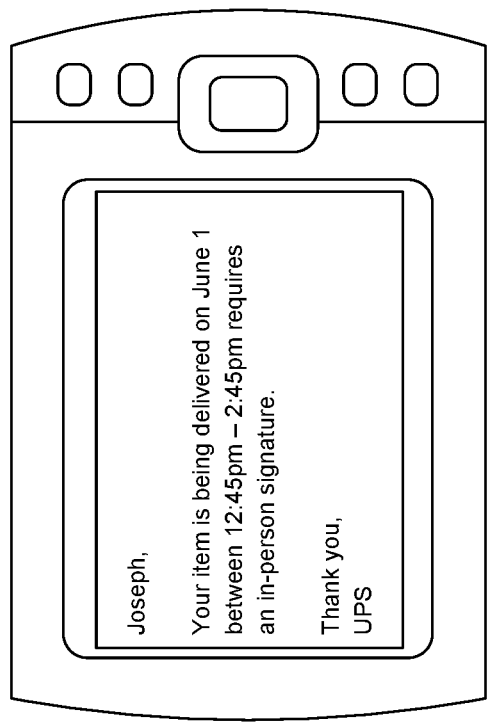
FIGS. 8A and 8B show exemplary input and output of various embodiments of the present invention.
Figure 8A:
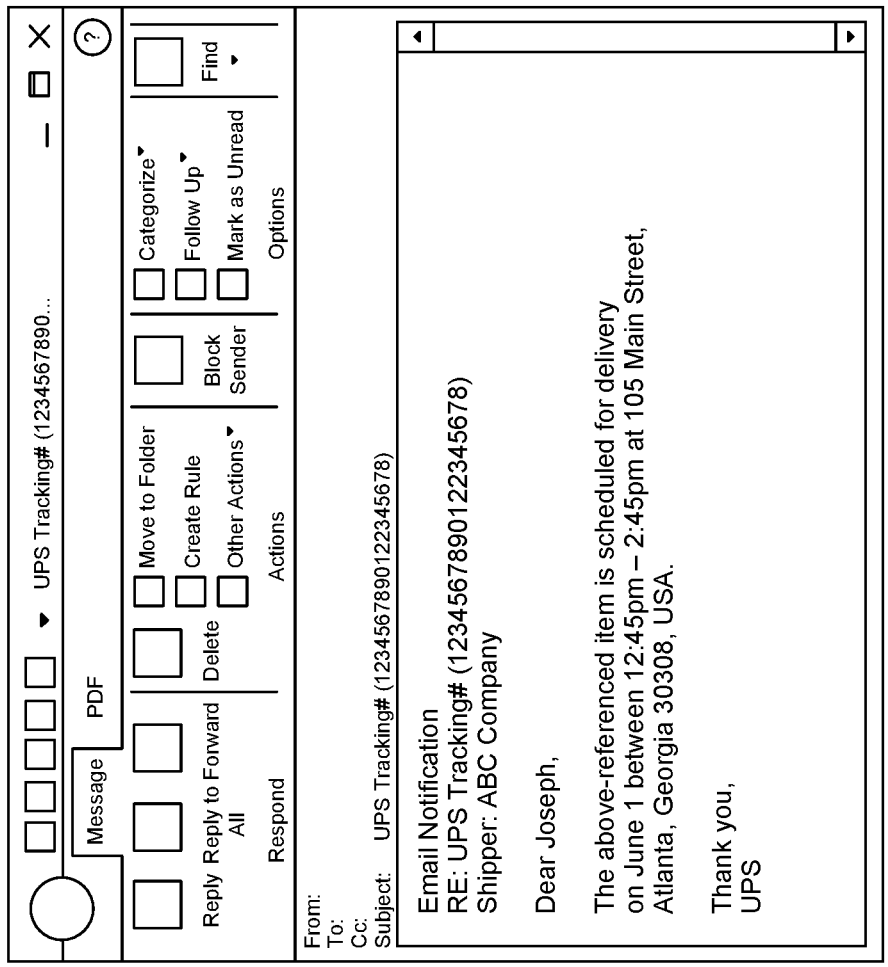

FIG. 7 is a flowchart illustrating operations and processes that may be performed for providing notification, to a customer computing device, of a delivery location, a delivery time, and a delivery day based on communication preferences of the consignee. For example, consignees may specify in their communication preference how and when to be contacted, such as by email the morning of the scheduled delivery. The messages may indicate the delivery location, delivery date and/or delivery time, such as shown in FIGS. 8A and 8B, and a variety of other information. As will be recognized, a variety of other operations and processes may be used with embodiments of the present invention. These operations and processes can be customized to adapt to various needs and circumstances. Referring back to FIG. 7, as is shown in operation 705, an apparatus, such as the last mile carrier system or carrier system 100, may include means, such as the processor 205 or the like, for storing communication preferences for providing information/data indicative of the delivery location and the delivery time, wherein the communication preferences (1) identify at least one communication format and at least one corresponding electronic destination address to be used in providing the information/data to the customer, and (2) define a time period prior to a first carrier attempt of the item in which a message providing the information/data is to be transmitted to the at least one corresponding electronic destination address. In some embodiments, the at least one communication format is selected from the group consisting of a text message, an email message, a voice message, a picture message, a video message, and a social media message.

As is shown in operation 710, an apparatus, such as the last mile carrier system or carrier system 100, may include means, such as the processor 205 or the like, for automatically generating a message providing the information/data regarding the item to be delivered to the customer. As is shown in operation 715, an apparatus, such as the last mile carrier system or carrier system 100, may include means, such as the processor 205 or the like, for automatically transmitting the message to the at least one corresponding electronic destination address within the defined time period prior to the first carrier attempt of the item to the customer. FIGS. 8A and 8B show exemplary user interfaces providing the delivery location and the delivery time in accordance with some embodiments. In some embodiments, the carrier system 100 may automatically generate (e.g., via the message module 260) one or more messages providing information/data regarding an item to be delivered to the customer, for example, in compliance with the consignee's communication preferences. Similarly, the carrier system 100 may automatically transmit the one or messages to the electronic destination addresses in compliance with the consignee's communication preferences. For example, the carrier system 100 may generate and transmit an email message to a consignee email address and a text message to a consignee's cellular phone the day before an item is to be delivered to the consignee's home address.

C. Exemplary Embodiments

FIG. 9 shows a data flow diagram. The system 900 may include a carrier system (e.g., the last mile carrier system) and a client device embodied by, for example, consignee computing device 110 shown in FIG. 3. In some embodiments, as is shown in operation 910, an apparatus, such as the client device embodied by, for example, consignee computing device 110, may include means, such as the processing device 308 or the like, for registering for, for example, "Alternate Consignee Delivery Network." As such, in some embodiments, an apparatus, such as the last mile carrier system or carrier system 100, may include means, such as the processor 205 or the like, for executing a registration process, such as that described above with reference to FIG. 4. Once registered, as is shown in operation 920, an apparatus, such as the client device embodied by, for example, consignee computing device 110, may include means, such as the processing device 308 or the like, for providing an indication choosing to become a repository (e.g., an alternative consignee).

Once a customer chooses to apply to become a repository/alternative consignee, a verification process may be performed by, for example, the last mile carrier system or carrier system 100, or the like. As such, if verified, as is shown in operation 930, an apparatus, such as the last mile carrier system or carrier system 100, may include means, such as the processor 205 or the like, for approving the consignee. As is shown in operation 940, an apparatus, such as the last mile carrier system or carrier system 100, may include means, such as the processor 205 or the like, for allowing the consignee to become a repository. Subsequent to being a repository/alternative consignee, as is shown in operation 950, an apparatus, such as the last mile carrier system or carrier system 100, may include means, such as the processor 205 or the like, for selecting the consignee as a repository/alternative consignee when, for instance, the consignee provides an indication of availability.

Referring back to operation 960, after the registration and having to select whether or not to become an approved repository, as is shown in operation 960, an apparatus, such as the client device embodied by, for example, consignee computing device 110, may include means, such as the processing device 308 or the like, for allowing delivery of packages to a repository. Once allowing delivery, selection may be made. Accordingly, as is shown in operation 970, an apparatus, such as the client device embodied by, for example, consignee computing device 110, may include means, such as the processing device 308 or the like, for selecting one or more repositories at which delivery may be made. As described above with reference to FIG. 5, the carrier system 100 may determine the availability of a repository/alternative consignee. Accordingly, as is shown in operation 980, an apparatus, such as the client device embodied by, for example, consignee computing device 110, may include means, such as the processing device 308 or the like, for setting options for disposition of the parcel if the selected repository is unavailable. For example, the parcel may be delivered to the original consignee, a second priority alternative consignee, etc.

FIG. 10 shows a data flow diagram. The system 1000 may include a carrier system (e.g., the last mile carrier system) and a client device embodied by, for example, consignee computing device 110 shown in FIG. 3. Accordingly, FIG. 10 shows a data flow diagram that may be performed by a system 1000 for executing a delivery of an item/parcel in accordance with an "Alternate Consignee Delivery Network." In some embodiments, as is shown in operation 1005, an apparatus, such as the last mile carrier system or carrier system 100, may include means, such as the processor 205 or the like, for receiving new shipping information/ data, the new shipping information/data indicative of an item awaiting delivery to the original consignee. As is shown in operation 1010, an apparatus, such as the last mile carrier system or carrier system 100, may include means, such as the processor 205 or the like, for determining whether the original consignee participates in, for example, an "Alternate Consignee Delivery Network" or the like. If it is determined that the original consignee does not participate, the carrier system may notify the original consignee of the item/parcel. Accordingly, as is shown in operation 1015, an apparatus, such as the client device embodied by, for example, consignee computing device 110, may include means, such as the processing device 308 or the like, for receiving notification of parcel delivery to the original consignee.

If, however, it is determined that the original consignee participates in the "Alternate Consignee Delivery Network," then, as is shown in operation 1020, an apparatus, such as the last mile carrier system or carrier system 100, may include means, such as the processor 205 or the like, for determining whether the original consignee has selected a repository as an alternative consignee. If the original consignee has not yet selected a repository as an alternative consignee, as is shown in operation 1025, an apparatus, such as the client device embodied by, for example, consignee computing device 110, may include means, such as the processing device 308 or the like, for receiving notification of the item/parcel and one or more options (e.g., candidate alternative delivery location/consignees). Subsequently, as is shown in operation 1030, an apparatus, such as the client device embodied by, for example, consignee computing device 110, may include means, such as the processing device 308 or the like, for selecting a repository as an alternative consignee.

Once the original consignee has selected a repository as an alternative consignee or, in response to the determination of a yes at operation 1020, as is shown in operation 1035, an apparatus, such as the last mile carrier system or carrier system 100, may include means, such as the processor 205 or the like, for executing the process for delivering the item/parcel to the selected repository and notifying the original consignee of the delivery. Once delivered, as is shown in operation 1040, an apparatus, such as the client device embodied by, for example, consignee computing device 110, may include means, such as the processing device 308 or the like, for retrieving the parcel from the repository or otherwise providing confirmation of its reception. Subsequently, as is shown in operation 1045, an apparatus, such as the last mile carrier system or carrier system 100, may include means, such as the processor 205 or the like, for receiving confirmation and/or proof of delivery (e.g., an electronic signature, photo, or the like).

Figure 11:
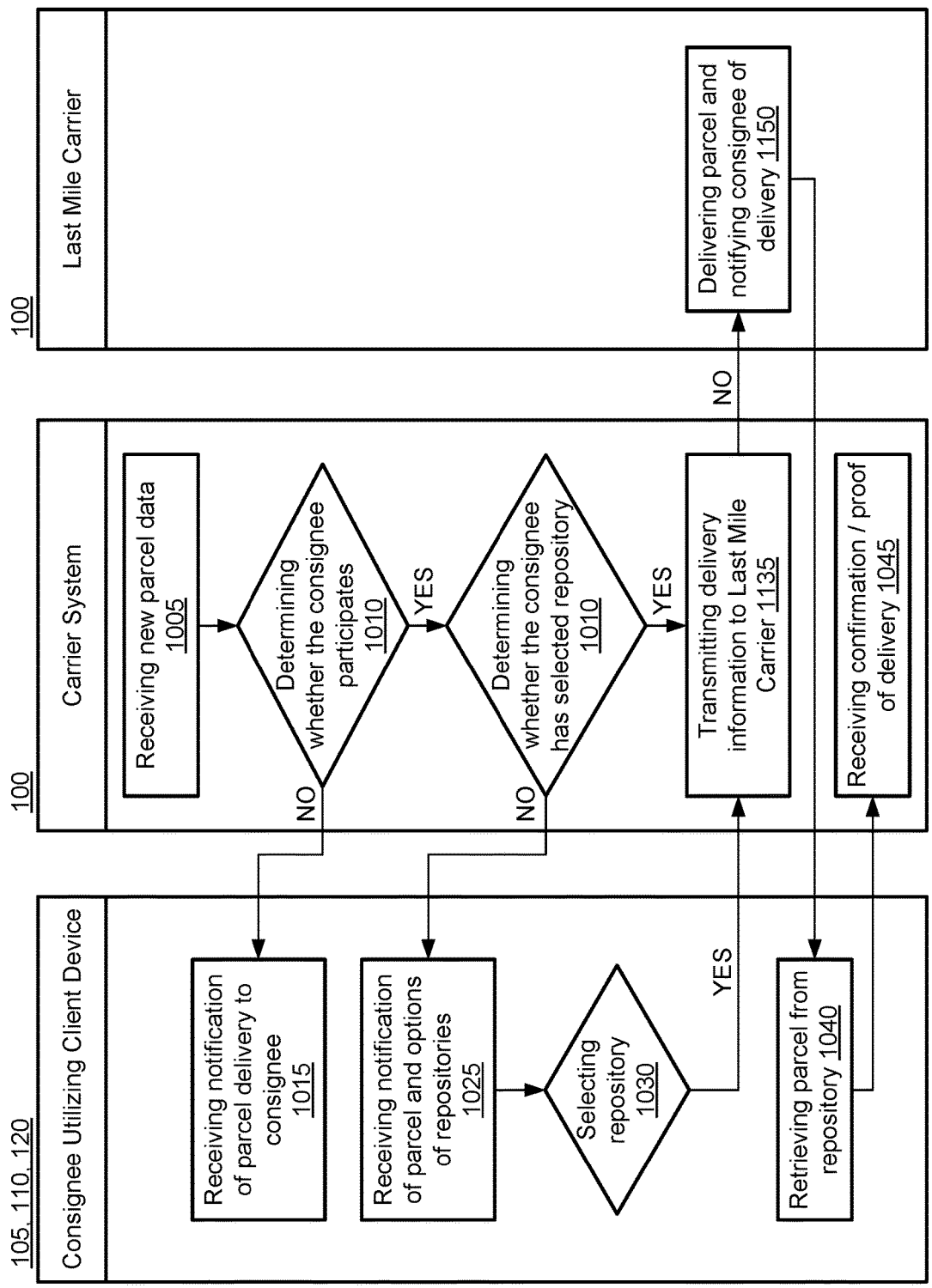

In some exemplary embodiments, some of the operations shown in the process described in FIG. 10 may be performed by a last mile carrier system, such as that shown in FIG. 11. Accordingly, FIG. 11 shows a data flow diagram that may be performed by a system 1100 for executing a delivery of an item/parcel in accordance with an "Alternate Consignee Delivery Network." The system 1100 may include a first carrier system (e.g., the carrier system), which may be embodied by carrier system 100 shown in FIG. 2, a client device embodied by, for example, consignee computing device 110 shown in FIG. 3, and a last mile carrier system, (e.g., shown here as the "last mile carrier system"), which may be embodied by a second instance of carrier system 100 shown in FIG. 2. Many of the operations, for which a detailed description is given with reference to FIG. 10, are identical, and as such, in the following embodiment, for brevity, detailed descriptions of identical portions are omitted. Specifically, operations 1005¬1030 shown in FIG. 10 correlate to operations 1105-1130 shown in FIG. 11.

Referring now to operation 1135, once the original consignee has selected a repository as an alternative consignee or, in response to the determination of a yes at operation 1120, as is shown in operation 1135, an apparatus, such as the carrier system 100, may include means, such as the processor 205 or the like, for transmitting the delivery information/data (e.g., the new parcel data referenced above with respect to operation 1005 and the selected repository) to the last mile carrier (e.g., last mile carrier system).

Subsequently, as is shown in operation 1150, an apparatus, such as the last mile carrier system, may include means, such as the processor 205 or the like, for executing the process for delivering the item/parcel to the selected repository and notifying the original consignee of the delivery of the item/parcel to the selected repository. Once delivered, as is shown in operation 1140, an apparatus, such as the client device embodied by, for example, consignee computing device 110, may include means, such as the processing device 308 or the like, for retrieving the parcel from the repository or otherwise providing confirmation of its reception. Subsequently, as is shown in operation 1145, an apparatus, such as the last mile carrier system or carrier system 100, may include means, such as the processor 205 or the like, for receiving confirmation and/or proof of delivery (e.g., an electronic signature, photo, or the like).

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for delivering an item to an alternative final delivery destination the method comprising:
receiving the item at a facility within a delivery network;
receiving, via a data transmission computer network, shipping information/data for the item, the shipping information/data, input at a client device, indicating the item to be delivered to an original consignee, the original consignee being a default customer for which the item is scheduled be delivered for at a default delivery location, the default delivery location being an address indicated on a shipping label as indicated by a consignor;
determining whether the original consignee is one participant among a plurality of participants in an alternate consignee delivery network, each participant, of the plurality of participants, being able to select, an alternative consignee from among the plurality of participants in the alternative consignee delivery network when the participant is unavailable to receive items for acting as the alternative consignee, the alternative consignee being another customer associated with another delivery location;

in response to a determination that the original consignee is among the plurality of participants in the alternative consignee delivery network, determining that the original consignee has not indicated a first priority alternative consignee among the plurality of participants in the alternative consignee delivery network to deliver the item to, wherein the first priority alternative consignee is associated with a respective alternative delivery location that is a candidate for delivery of the item;

at least partially in response to the determining that the original consignee has not indicated the first priority alternative consignee, determining, using a location determining device of an unattended vehicle associated with the original consignee, a first set of coordinates of the location determining device;

subsequent to the determining of the first set of coordinates, receiving a code entered at a carrier device of a carrier service provider;

in response to the receiving of the code, causing, by one or more processors, a control signal to be sent from the carrier device to the unattended vehicle that causes the unattended vehicle to open or unlock such that the unattended vehicle is able to receive the item.

2. The method of claim 1, wherein the causing of the control signal to be sent includes communicating to a third party car monitoring service that sends the control signal to the unattended vehicle.

3. The method according to claim 1, wherein the location determining device is a mobile device of the original consignee.

4. The method according to claim 3, wherein the determining of the first set of coordinates includes finding the unattended vehicle using GPS coordinates of the mobile device.

5. The method according to claim 4, wherein the finding of the unattended vehicle includes receiving a customer notification from the original consignee as to a location of the unattended vehicle.

6. The method according to claim 1, further comprising:
providing, via the data transmission computer network, to the client device, notification that the item was delivered; and
providing, via the data transmission computer network, to the client device, a user interface configured to receive confirmation.

7. The method according to claim 1, further comprising: providing, via the data transmission computer network, to the client device, a user interface configured to enable the original consignee to indicate that the item should be delivered to the default delivery location.

8. The method according to claim 1, further comprising: providing, via the data transmission computer network, to the client device, a user interface configured to enable the original consignee to register as one of the one or more alternative consignees, enabling other original consignees to select the original consignee as one of their alternative consignees.

9. A system for delivering an item to an alternative final delivery destination, the system comprising:

a carrier system, comprising one or more processors, that operates to:
receive, over a wired or wireless protocol computer network and via input at a user interface of a client device, shipping information for the item, the item located at a facility within a delivery network, the shipping information indicating the item to be delivered to an original consignee by a carrier and comprising at least a default delivery location, the original consignee being a default customer for which the item is scheduled be delivered for at a default delivery location, the default delivery location being an address on a shipping label as indicated by a consignor;
determine whether the original consignee is one participant among a plurality of participants in an alternate consignee delivery network;
upon determination that the original consignee is among the plurality of participants in the alternative consignee delivery network, determine, based at least in part on whether a selection was made to the user interface of the client device, whether the original consignee has indicated a first priority alternative consignee among the plurality of participants in the alternative consignee delivery network to deliver the item to, wherein the first priority alternative consignee being another customer and is associated with a respective alternative delivery location for delivery of the item; and the delivery network comprising one or more facilities or third party car monitoring service, that operates to:
based on whether the original consignee has indicated, via the user interface, the first priority alternative consignee among the one or more alternative consignees, determine, via a location determining device of an unattended vehicle associated with the original consignee or the first priority alternative consignee, a first set of coordinates of the location determining device; and
based at least in part on receiving a code entered at a carrier device of a carrier service provider, send, by the one or more processors, a control signal from the carrier device to the unattended vehicle that causes the unattended vehicle to open or unlock such that the item is able to be placed in the unattended vehicle.

10. The system of claim 9, wherein the sending of the control signal is preceded by communicating, by the one or more facilities, to the third party car monitoring service that sends the control signal to the unattended vehicle.

11. The system of claim 9, wherein the carrier system further operates to:
determine, subsequent to the reception of the shipping information for the item, whether the original consignee has elected to enable shipments to be delivered to at least one alternative consignee; and
in an instance in which the original consignee has not elected to enable shipments to be delivered to the at least one alternative consignee, provide a user interface configured to notify the original consignee of the item and allow one of registration or a single-time selection of the first priority alternative consignee.

12. The system of claim 9, wherein the memory and program code are further configured to, with the processor, cause the apparatus to:
in an instance in which the original consignee has not indicated the first priority alternative consignee or other candidate alternative consignee provide cost advantages over the first priority alternative consignee, receive a current GPS location of a mobile device of the original consignee; and provide one or more candidate alternative consignees based on the current GPS location of the mobile device of the original consignee.

13. The system of claim 12, wherein the memory and program code are further configured to, with the processor, cause the apparatus to:

determine whether the first priority alternative consignee is available to receive the item;

in an instance in which the first priority alternative consignee is available to receive the item, deliver the item to the first priority alternative consignee;

in an instance in which the first priority alternative consignee is not available to receive the item, determine a second priority alternative consignee;

determine whether the second priority alternative consignee is available to receive the item; and in an instance in which the second priority alternative consignee is available to receive the item, deliver the item to the second priority alternative consignee.

14. The system of claim 13, wherein the memory and program code are further configured to, with the processor, cause the apparatus to:

provide, over the wired or wireless protocol computer network, to the client device, a notification that the item was delivered, the notification comprising information indicative of which of the one or more alternative consignees to which the item was delivered; and provide, over the wired or wireless protocol computer network, to the client device, a user interface element of the user interface configured to receive confirmation.

15. The system of claim 9, wherein the memory and program code are further configured to, with the processor, cause the apparatus to:

provide, over a wired or wireless protocol computer network, to the client device, a user interface element of the user interface configured to enable the original consignee to indicate that the item should be delivered to the default delivery location.

16. The system of claim 9, wherein the memory and program code are further configured to, with the processor, cause the apparatus to:

provide, over the wired or wireless protocol computer network, to the client device, a user interface element of the user interface configured to enable the original consignee to register as one of the one or more alternative consignees, enabling other original consignees to select the original consignee as one of their alternative consignees.

17. A system for delivering an item to an alternative final delivery destination, the system comprising:

a computer program product comprising at least one non-transitory computer-readable storage medium having computer-readable program code portions stored therein, the computer-readable program code portions comprising:

an executable portion configured to receive, over a computer network, shipping information for the item, the item located at a facility within a delivery network, the shipping information, input at a client device, indicating the item to be delivered to an original consignee by a carrier, the original consignee being a default person or organization for which the item is scheduled be delivered for at a default delivery location;

an executable portion configured to determine whether the original consignee is one participant among a plurality of participants in an alternate consignee delivery network;

an executable portion configured to, upon determination that the original consignee is among the plurality of participants in the alternative consignee delivery network, determine whether the original consignee has indicated a first priority alternative consignee among the plurality of participants in the alternative consignee delivery network, wherein the first priority alternative consignee is another person or organization associated with a respective alternative delivery location that is a candidate for receiving the item; and in an instance in which a determination is made that the original consignee has indicated the first priority alternative consignee among the one or more alternative consignees, send a control signal to an unattended vehicle associated with the first priority alternative consignee to open or unlock the unattended vehicle for delivery of the item from the facility to the unattended vehicle as a final delivery location instead of the default delivery location.

18. The system of claim 17 further comprising:

the computer program product comprising an executable portion configured to provide, via the network, to the client device, notification that the item was delivered, the notification comprising information indicative of which of the one or more alternative consignees to which the item was delivered; and the computer program product comprising an executable portion configured to provide, over the computer network, to the client device, a user interface configured to receive confirmation.

19. The system of claim 17 further comprising:

the computer program product comprising an executable portion configured to provide, over the computer network, to the client device, a user interface configured to enable the original consignee to indicate that the item should be delivered to the default delivery location.

20. The system of claim 17 further comprising:

the computer program product comprising an executable portion configured to provide, over the computer network, to the client device, a user interface configured to enable the original consignee to register as one of the one or more alternative consignees, enabling other original consignees to select the original consignee as one of their alternative consignees.

* * * * *